(12) United States Patent
Chornenky

(10) Patent No.: US 11,463,231 B2
(45) Date of Patent: Oct. 4, 2022

(54) SYNCHRONIZED MULTI-CHANNEL COMMUNICATION DEVICE AND METHOD

(71) Applicant: NOKOMIS, INC., Canonsburg, PA (US)

(72) Inventor: Todd Eric Chornenky, Carmichaels, PA (US)

(73) Assignee: Nokomis, Inc, Canonsburg, PA (US)

( * ) Notice: Subject to any disclaimer, the term of this patent is extended or adjusted under 35 U.S.C. 154(b) by 0 days.

(21) Appl. No.: 17/020,337

(22) Filed: Sep. 14, 2020

(65) Prior Publication Data

US 2021/0083835 A1 Mar. 18, 2021

Related U.S. Application Data

(60) Provisional application No. 62/900,046, filed on Sep. 13, 2019.

(51) Int. Cl.
*H04L 7/00* (2006.01)
*H04B 17/336* (2015.01)
*H04B 1/16* (2006.01)

(52) U.S. Cl.
CPC ............. *H04L 7/0012* (2013.01); *H04B 1/16* (2013.01); *H04B 17/336* (2015.01); *H04L 7/0037* (2013.01)

(58) Field of Classification Search
CPC ... H04L 7/0012; H04L 7/0036; H04L 7/0037; H04L 7/0008; H04B 1/16; H04B 17/336
See application file for complete search history.

(56) References Cited

U.S. PATENT DOCUMENTS

| | | | | | |
|---|---|---|---|---|---|
| 5,677,927 A | * | 10/1997 | Fullerton | ................. | H04B 1/69 375/259 |
| 5,687,169 A | * | 11/1997 | Fullerton | ........... | H04B 1/71632 370/324 |
| 5,832,035 A | * | 11/1998 | Fullerton | ................. | H04B 1/56 375/150 |
| 6,133,876 A | * | 10/2000 | Fullerton | ................ | G01S 13/42 342/132 |
| 6,141,372 A | * | 10/2000 | Chalmers | ............. | H04B 1/7085 375/150 |
| 6,177,903 B1 | * | 1/2001 | Fullerton | .............. | G01S 13/878 342/21 |
| 6,304,623 B1 | * | 10/2001 | Richards | ................... | H03L 7/18 375/355 |
| 6,763,057 B1 | * | 7/2004 | Fullerton | ............ | H04L 25/4902 375/150 |
| 7,590,198 B2 | * | 9/2009 | Sanada | ................ | H04B 1/7183 370/503 |

(Continued)

OTHER PUBLICATIONS

F. Rivet, Y. Deval, D. Dallet, JB. Begueret and D. Belot, "A Disruptive Software-Defined Radio Receiver Architecture Based on Sampled Analog Signal Processing," in Proc. IEEE RFIC, Honolulu, USA, pp. 197-200, Jun. 2007.

(Continued)

*Primary Examiner* — James M Perez
(74) *Attorney, Agent, or Firm* — AP Patents; Alexander Pokot

(57) ABSTRACT

An apparatus and method to transmit and receive messages within and near the noise floor by pulsed signals that are time synchronized and are not easily intercepted by use of frequency and time slots as well as intermittent transmissions.

17 Claims, 14 Drawing Sheets

(56) References Cited

U.S. PATENT DOCUMENTS

| | | | | |
|---|---|---|---|---|
| 7,787,516 | B2* | 8/2010 | Kim | H04B 1/7183 375/138 |
| 7,889,753 | B2* | 2/2011 | Ekbal | H04B 1/71632 370/431 |
| 10,840,969 | B1* | 11/2020 | Barnawi | H04B 1/04 |
| 2002/0030596 | A1* | 3/2002 | Finn | H04B 1/7183 340/572.1 |
| 2003/0108126 | A1* | 6/2003 | Akopian | G01S 19/29 375/326 |
| 2003/0108133 | A1* | 6/2003 | Richards | H04B 1/69 375/351 |
| 2003/0232612 | A1* | 12/2003 | Richards | H04B 1/71637 455/323 |
| 2004/0165650 | A1* | 8/2004 | Miyazaki | H04B 1/7097 375/141 |
| 2006/0088081 | A1* | 4/2006 | Withington | H04B 1/7172 375/130 |
| 2008/0180321 | A1* | 7/2008 | Wang | G01S 19/29 375/E1.003 |
| 2011/0182335 | A1* | 7/2011 | Pratt | H04L 27/0014 455/226.1 |
| 2013/0136154 | A1* | 5/2013 | Chomal | H04B 1/709 375/136 |
| 2015/0241493 | A1* | 8/2015 | Canne | G01R 29/0814 324/612 |
| 2015/0323642 | A1* | 11/2015 | Mutz | G01S 3/74 342/417 |
| 2016/0269170 | A1* | 9/2016 | Kurby | H04L 7/0025 |
| 2017/0023632 | A1* | 1/2017 | Johnson | G01R 31/11 |
| 2018/0254928 | A1* | 9/2018 | Chu | H04L 25/03165 |
| 2021/0083835 | A1* | 3/2021 | Chornenky | H04L 7/0037 |
| 2021/0105036 | A1* | 4/2021 | Chornenky | H04L 7/0012 |
| 2021/0399648 | A1* | 12/2021 | McCartney | H02M 1/0012 |
| 2022/0026192 | A1* | 1/2022 | Sinclair | H04L 7/0008 |

OTHER PUBLICATIONS

F. Rivet, Y. Deval, D. Dallet, JB. Begueret, P. Cathelin and D. Belot, "A Disruptive Receiver Architecture Dedicated To Software Defined Radio," in IEEE TCAS-II, vol. 55, n4, pp. 344-348, Apr. 2008. Show Context View Article Full Text: PDF (359KB) Google Scholar.

F. Rivet, Y. Deval, JB. Begueret, D. Dallet, P. Cathelin and D. Belot, "From Software-Defined to Software Radio Analog Signal Processor Features," in Proc. IEEE RWS'09, San Diego, USA, Jan. 2009.

F. Rivet, Y. Deval, D. Dallet, JB. Begueret and D. Belot, "65nm CMOS Circuit Design of a Sampled Analog Signal Processor dedicated to RF Applications," in Proc. IEEE NEWCAS'08, Montreal, Quebec, pp. 233-236, Jun. 2008.

* cited by examiner

➢ 1 bit lasts 2 seconds
➢ 8-bit word (lasts 16 seconds) repeats itself

Time Coherence Integration Operation of a 2-Second Bit Signal

8-Tap Time-Coherence Integrated Bit Signal

8-Tap Time Coherence + Non-Coherence Bit Signal 1 cycle contains 8 data points

SYNCHRONIZED MULTI-CHANNEL COMMUNICATION DEVICE AND METHOD

RELATED APPLICATION

Provisional Application Ser. No. 62/867,789 filed Jun. 27, 2019 and Provisional Application No. 62/900,046 filed Sep. 13, 2019 that are incorporated by reference herein as if specifically set forth at length. Priority is claimed from Provisional Application No. 62/900,046.

REFERENCE TO SEQUENCE LISTING, A TABLE, OR A COMPUTER PROGRAM LISTING COMPACT DISC APPENDIX

N/A

FEDERALLY SPONSORED RESEARCH OR DEVELOPMENT

Army SBIR Phase II Contract No. W9124R-17-C-0012

BACKGROUND OF INVENTION

Radio communications in high noise environments typically require signal strength that is greater than the noise floor and also is generally insecure. This invention allows reconstruction of communication messages received at or far below the noise floor. This invention also has applicability to receive messages in highly attenuated environments such as deep within jungle canopy, when transmission power is relatively weak, or when the separation distance between transmitter and receiver is very far away.

Conventional communication utilizes Very/Ultra High Frequency (V/UHF) signals of 30 MHz to 3 GHz, which have maximum ranges of approximately 7 km with Line of Sight (LOS) in environments such as rainforests. The jungle canopy typically attenuates V/UHF signals by 80 dB from the top of the canopy to the jungle floor. The conventional approach to extend radio communications is to create Mobile Ad Hoc Networks (MANETs) to utilize hardware as communications relays. This approach relies on multiple systems throughout a jungle or rainforest environment to ensure communication and is often impractical. Therefore, a device and method of transmitting and receiving radio communication signals is needed to ensure communications in especially challenging environments.

BRIEF SUMMARY OF INVENTION

Time Enhanced Coherent Integration

The technical problem is to transmit a radio communication into an environment with difficult terrain or environments not well suited for V/UHF tactical communications without hardware relays. The physical hardware system constraints of the transmission and receiving hardware includes size and weight considerations for mobility in such environments. The present device uses a combination of coherent and non-coherent integration to detect signals that are received at sub-noise floor levels. The signal may be reflected from the ionosphere. The present device consists of a transmitter FIG. 14 and receiver FIG. 15 unit that are each frequency matched to a sufficient degree to also be substantially phase locked for a period of coherent integration time to each other using a clock source. The transmitted signal may be comprised of repeated multiple bit binary data packets. The threshold of determining a binary '1' or '0' is the detection of the presence of a-received signal (resulting in a 1) or the non-presence of a received signal (resulting in a 0). The receiver unit uses Time Enhanced Coherent Integration (TeCI) employing a series of sampling occurrences within each bit to detect and identify as Specified bit binary value of a signal. The receiver unit may then non-coherently integrate the bit-stream over multiple transmitted data packets to increase the Signal to Noise Ratio (SNR).

The invention addresses how TeCI can be utilized to construct a transmitted signal that can be reconstructed across a long range, without Loss of Signal (LOS) and be reconstructed by a mobile receiving device. TeCI performed using precisely timed sample locations within a waveform enables the extraction of signals from transmissions that would be otherwise considered to be noise. By using time synchronized transmission and reception, fixed signal sampling over repeated waveforms can extract a frequency specific signal.

The transmitted signal has an intended binary message having a contiguous series of bits. The high bit (value one) is a continuous waveform series signal. The low bit (value zero) is the absence of a contiguous waveform series. The waveform series signal is a waveform of higher frequency than the bit rate frequency, with a fixed peak to peak amplitude. The waveform may be sinusoidal or non-sinusoidal, and may be narrowband or wideband.

The binary bit pattern may be comprised of sequential repeated waveforms such as sinusoidal, sawtooth, square, or other arbitrary waveform configurations.

The received signal is an attenuated version of the transmitted signal. The received signal may be attenuated by the jungle canopy, distance, water, environmental, atmospheric, and multipath destructive interference. The received signal amplitude is typically below the background noise floor signal amplitude at the point of the receiver.

The transmitter is comprised of an antenna, a Radio Frequency (RF) power amplifier, a clock source, a message encoder means, a logic element, and/or a message input interface.

The receiver has an antenna, a clock source, a message output, a coherent integration unit, logic element, voltage comparator, an analog voltage sampler, the receiver in another embodiment also has a non-coherent integration unit.

The receiver performs signal processing on the received signal, through a software or hardware implementation. The signal processing is by one or more of a combination of coherent integration, non-coherent integration, and integration amplitude result signal threshold comparison function. The signal processing preferred embodiment uses TeCI to improve the SNR by precisely repeatedly sampling the continuous waveform series signal of each bit received. The TeCI sampling consists of multiple samples for each cycle of the continuous waveform series signal of a bit. The sampled points within each bit's contiguous waveform series signal cycle are integrated to enhance SNR of the attenuated contiguous waveform series signal within or of each bit.

For each bit of the transmitted signal there is a resulting compiled integrated waveform. Each completed bit stream data packet is an individual signal iteration. Multiple signal iterations may be accumulated over time and appended into a Non-Coherently Integrated (NCI) bit chain to further enhance SNR for each individual bit of the transmitted message.

An NCI method such as Fast Fourier Transform (FFT), or averaged values of TeCI max-min values is used on the NCI bit chain to further enhance the SNR and determine the bit value by amplitude threshold comparison to determine the presence or absence of the waveform series signal.

The ability to extract sub-noise floor signals from radio communications without relying on hardware relays in environments that deny long range tactical communications permits reliable signal transmission without LOS requirements. This can have dual use for civilian and military tactical communications in a jungle or rainforest environments. It may also have use for civilian emergency communications or for low-cost IOT communication not requiring high bit rates.

Pulsed Signals

An additional technique to be applied to achieve or enhance effective secure communications in a high noise environment is to pulse signals within time slots or time divisions in the time domain. The signals are communicated between at least one time synchronized transmitter and at least one time synchronized receiver. The waveform characteristics constrain coherent and non-coherent integration techniques. These techniques detect or reconstruct the signal in the background noise.

The pulsed signal data content is embodied in or further increase the number of bits in a message. Using this additional technique, the message typically does not completely fill a continuous time or frequency slot, which thus also allows for multiple communication channels. The timing of bits to be transmitted and read allows for a more secure message because only the message bit's time or frequency slot are read and integrated. The other non-message 'empty' bits time locations or frequency slots contain only noise. Empty locations are ignored or not processed to create the final message. The non-message 'empty' bit locations are not significant for the message. These empty bit locations are noise or can be used as channels for other messages. The transmissions are therefore intermittent filling only designated bit locations. Due to the noise content of the unused and empty bit locations, if they are integrated along with time slots containing signal, they will substantially lower SNR and increase receive time needed to integrate before a message is received or sensed.

Intermittent transmissions may be used to lower the average power for a message of a specific length by encoding more virtual bits of information as time and or frequency slots while also obscuring the message. Alternatively, the intermittent transmission may serve to maintain the average power but increase the signal to noise ratio (SNR). The SNR increase is useful while receiving below, or near the noise floor. A precisely timed encoded message is transmitted in predetermined frequency or time slots, said slot locations being used to encode additional data content bits. Additionally, the transmission power of the message during the time slot may be higher or far higher than the average power, but the message may be transmitted far less often and/or of a briefer duration. Thus, the total power used for transmission may remain substantially the same, but more total message bit content may be sent. Additional open multiple time slots or frequency slots are also available for encoding or for other transmissions. An embodiment offers the use of: (1) greater transmission power during transmission periods accompanied by periods on non-transmission, while maintaining substantially the same average power overall, in combination with the and making available (2) time or (3) frequency slots. This allows for as many as 3 methods to beneficially combine to further increase SNR over using a precisely timed encoded message only sent continuously.

DETAILED DESCRIPTION OF INVENTION

Determining Optimal Coherent Integration Period

Figure 1:
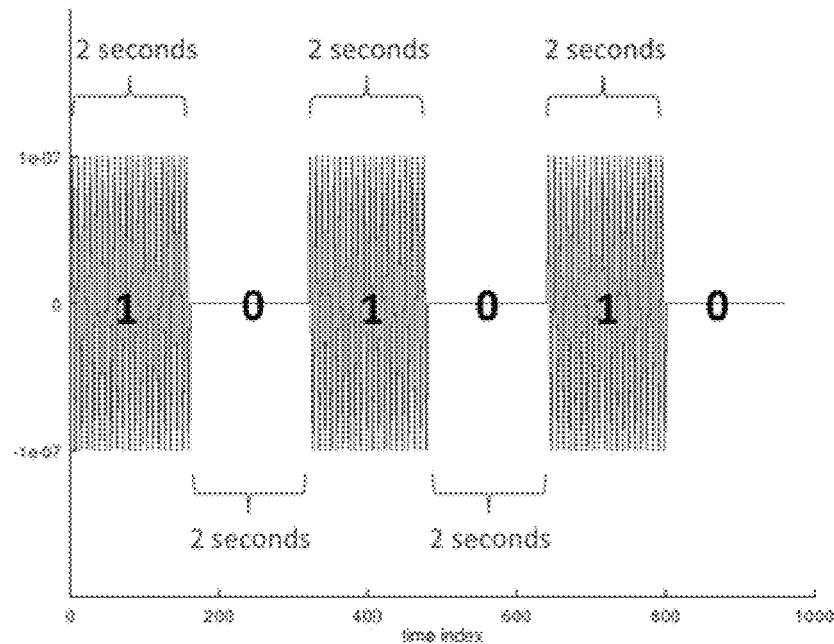
FIG. 1 is an illustration of intervals of signal and non-signal slots, separate signals, one sent periodically at the same frequency, one sent periodically but at different frequencies, one sent both in different non-periodic time frames and at different frequencies, and one sent non-periodically at the same frequency.
Figure 2:
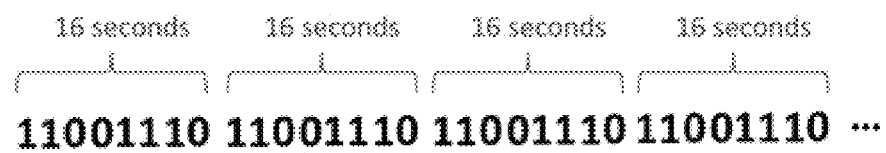
FIG. 2 is an illustration of an 8 bit 2 second repeating signal.
Figure 2A:
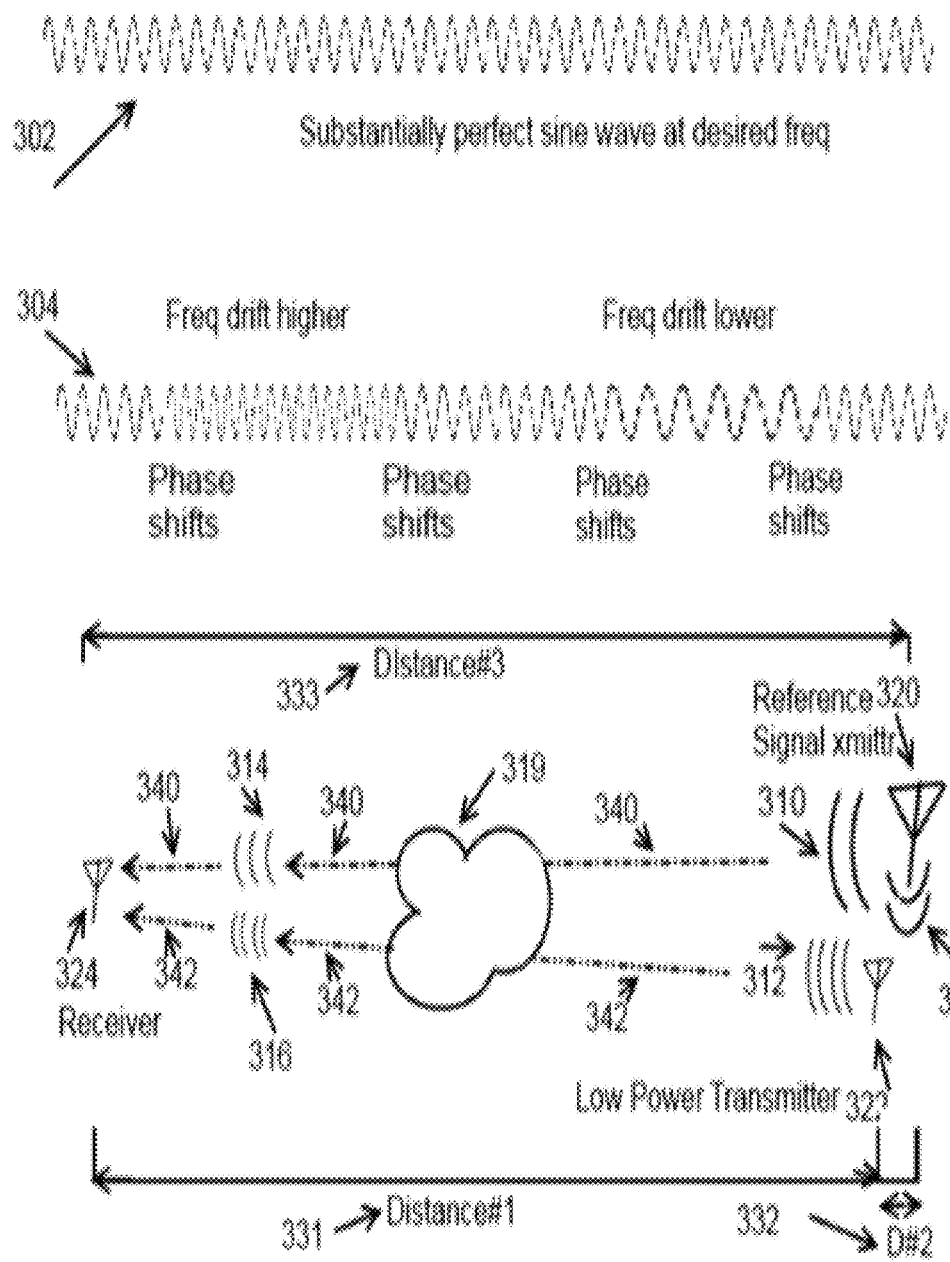
FIG. 2A. Is an illustration of substantially a strong signal with phase and or frequency variations coming from a strong transmitter, and a weaker transmitter, with the strong signal with phase and or frequency variations being eventually received and used as a time base by a weaker transmitter with the strong signal received to also be used as a as a time base by a receiver to allow the receiver to better receive the weaker transmitter's signal, both transmitter and receiver sharing and using the same time base signal although possibly at different times and thus different sections of the time base signal as there is a time delay incurred by the receiver of the time base embedded in the transmitter's signal FIG. 3 Is an illustration of coherent and noncoherent integration of an 8 tap time coherent bit signal FIG. 4. Is an illustration of a 2 second bit to an 8 tap integration of multiple signals. an intentional or unintentional rf emission changing frequency and/or phase relative to a receiver ? The change may be, but is not limited to, doppler shift due to relative motion between the two, and/or the local oscillator of the transmitter drifting.
Figure 3:
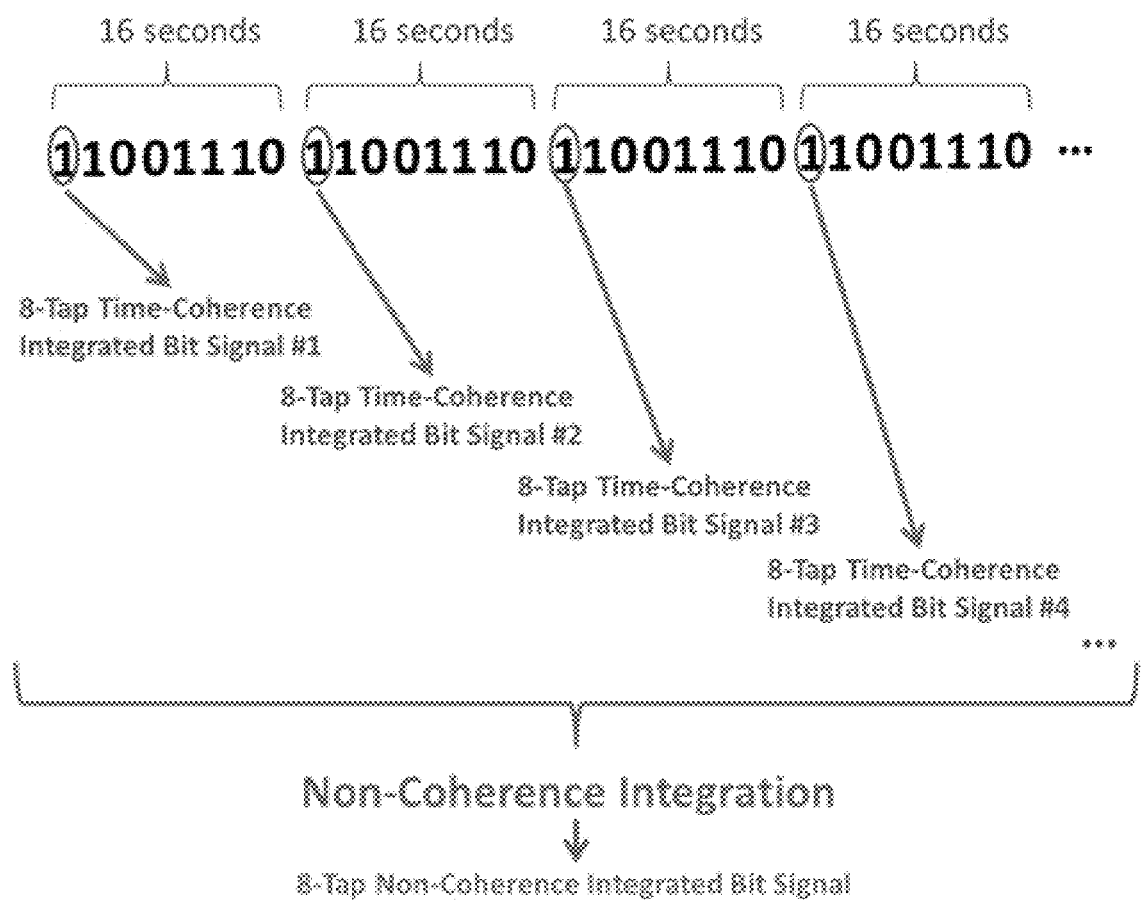
Figure 4:
FIG. 4 also shows the reference oscillator used by the ADC being varied to match the change in the received emission.
Figure 5:
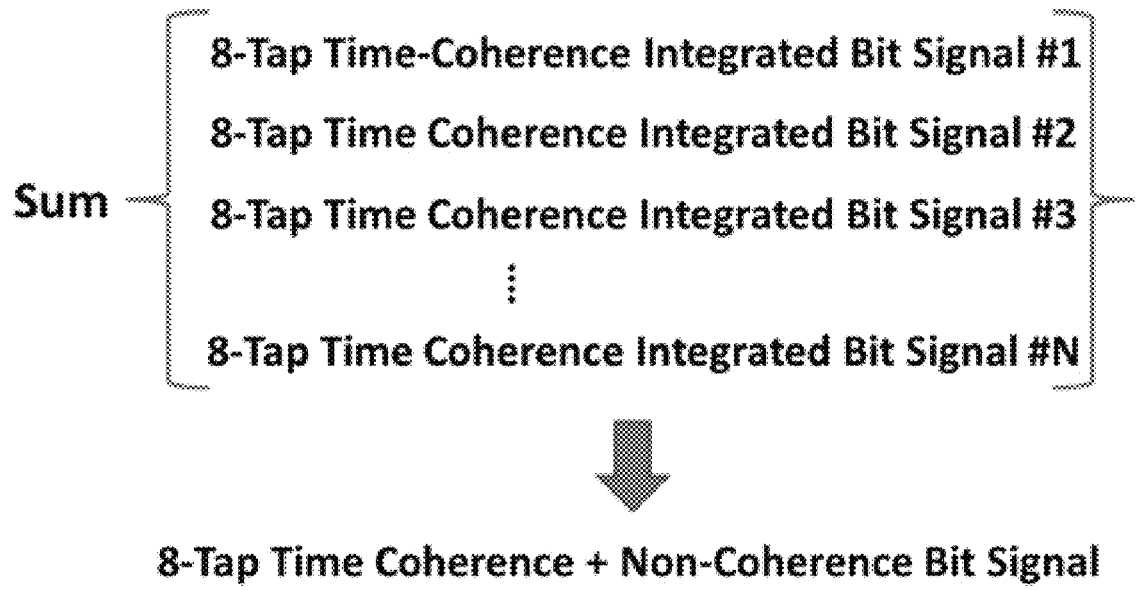
FIG. 5. is an illustration of n-bit integration and noncoherent integration.
Figure 6:
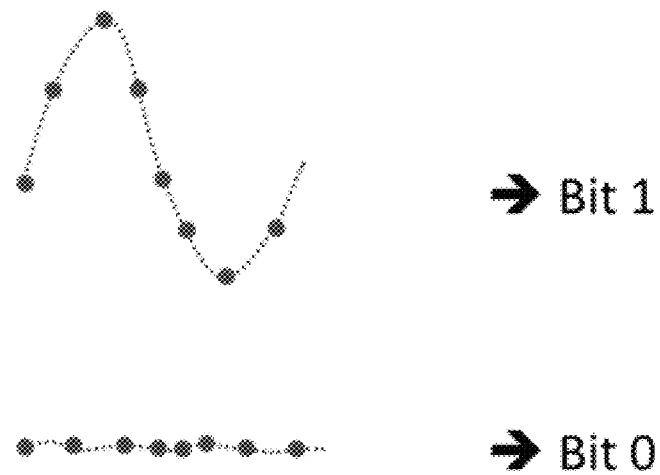
FIG. 6 is graph of a bit1 and bit 0 cycle.
Figure 7:
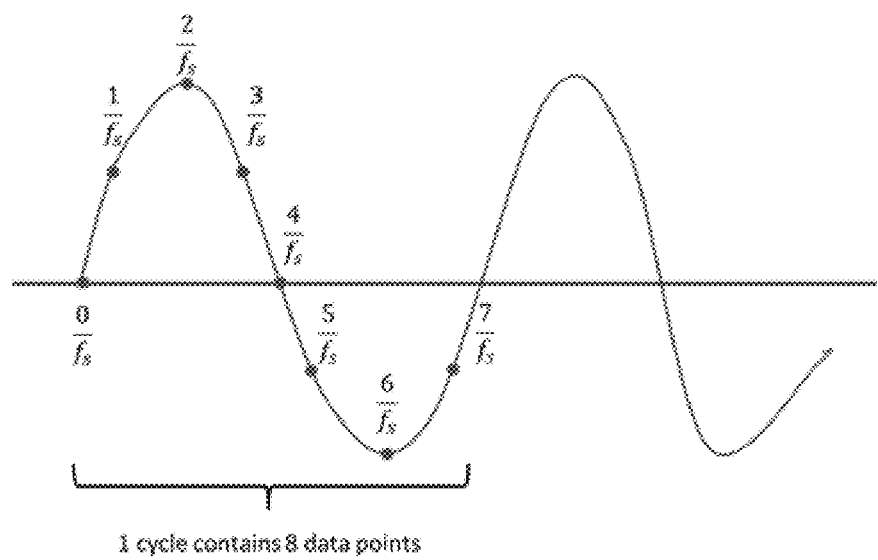
FIG. 7 is graph of 8 bits in one cycle.
Figure 8:
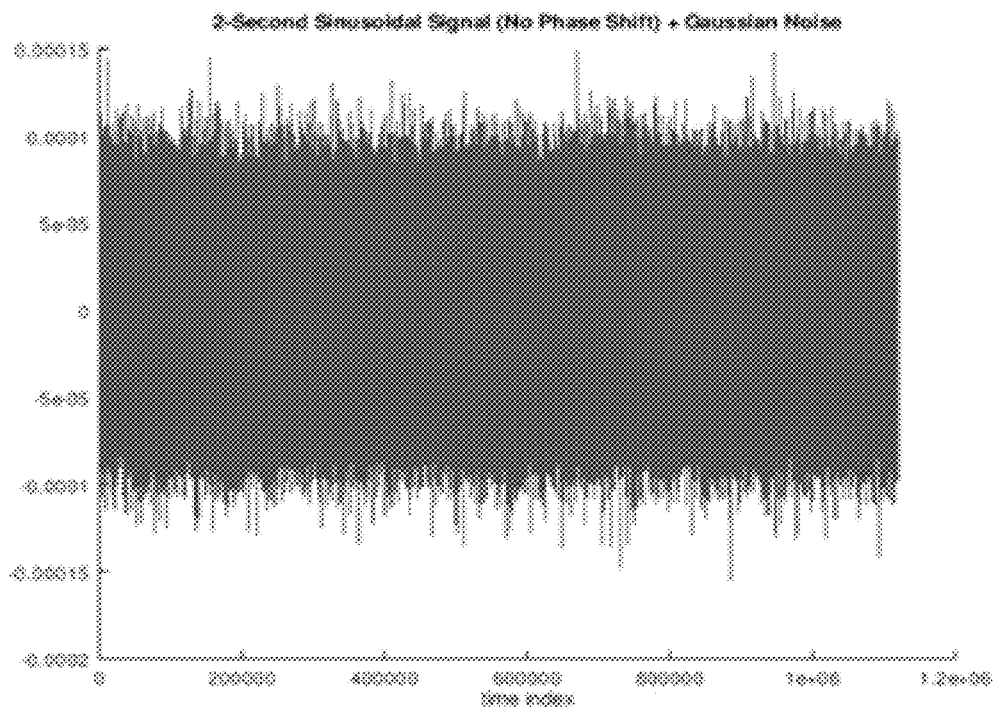
FIG. 8 is a graph of 2 second sinusoidal signal with gaussian noise without a phase shift with 50 loops.
Figure 9:
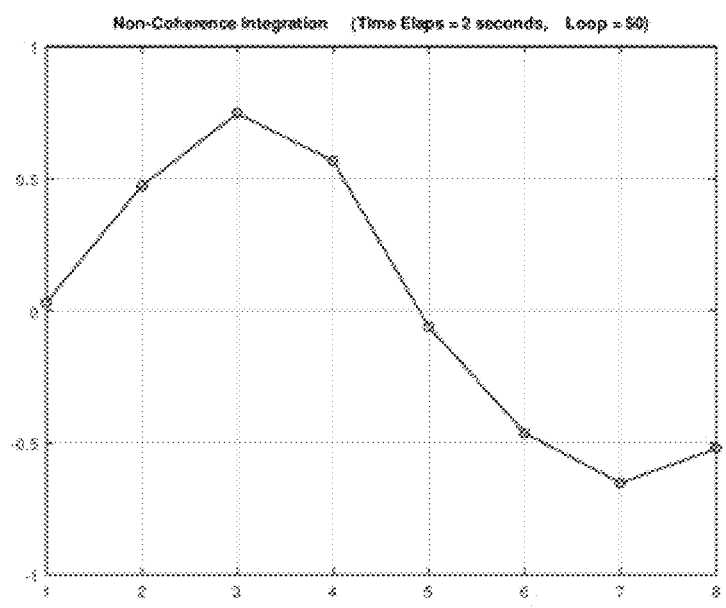
FIG. 9 is a graph of noncoherent integration of the signal of FIG. 8 with 50 loops not phase shifted.
Figure 10:
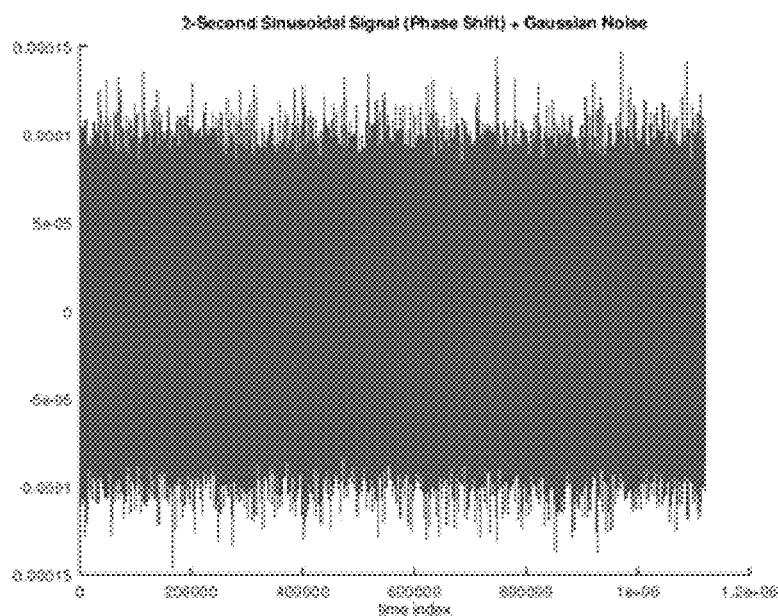
FIG. 10 is a graph of 2 second sinusoidal signal with gaussian noise and phase shifted.
Figure 11:
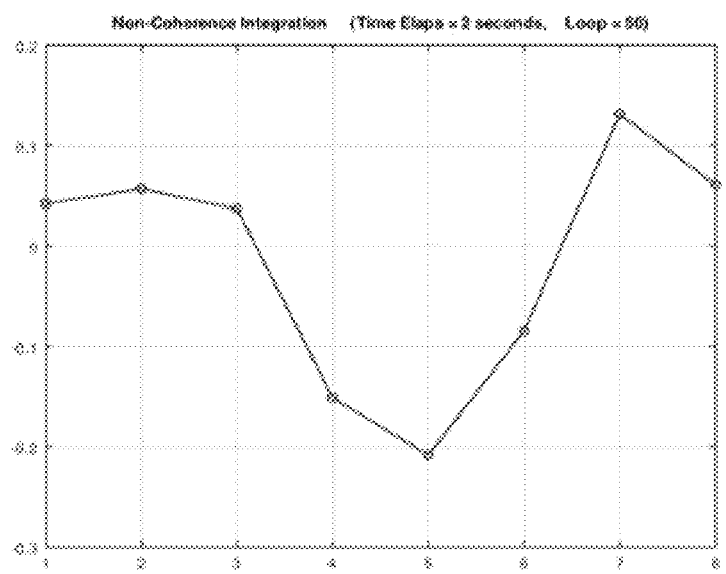
FIG. 11 FIG. is a graph of noncoherent integration of the signal of FIG. 10 with 50 loops phase shifted.
Figure 12:
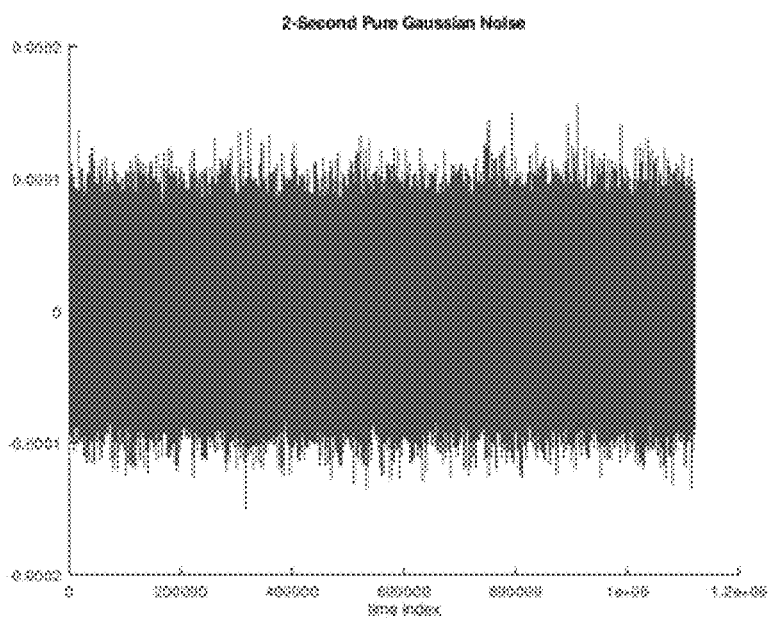
FIG. 12 is a graph of a signal within 2 seconds of pure gaussian noise.
Figure 13:
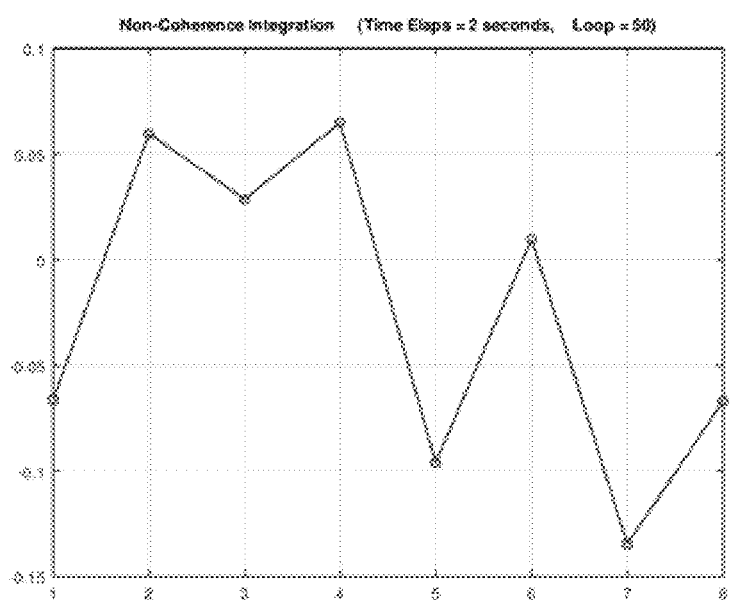
FIG. 13. is a graph of 2 second noncoherent integration of the signal of FIG. 12 with 50 loops
Figure 14:
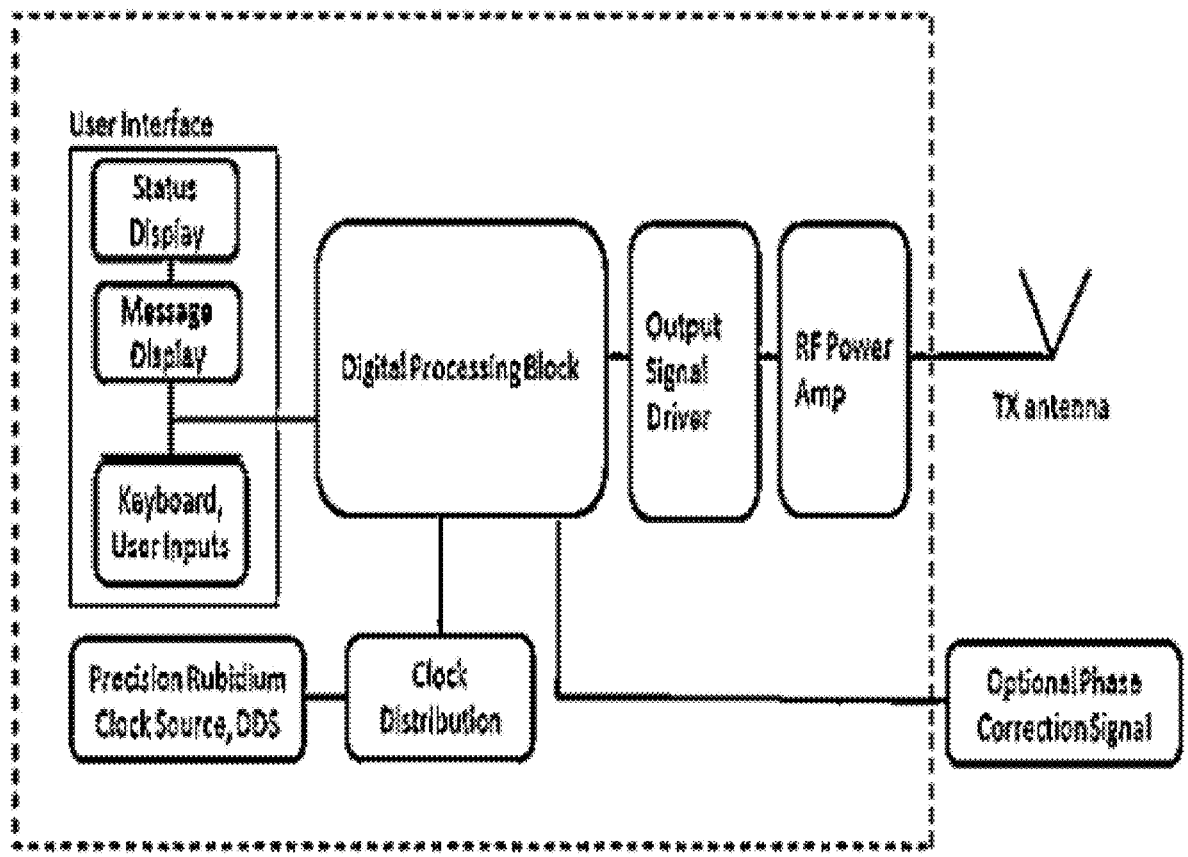
FIG. 14 is a block diagram of the transmitter.
Figure 15:
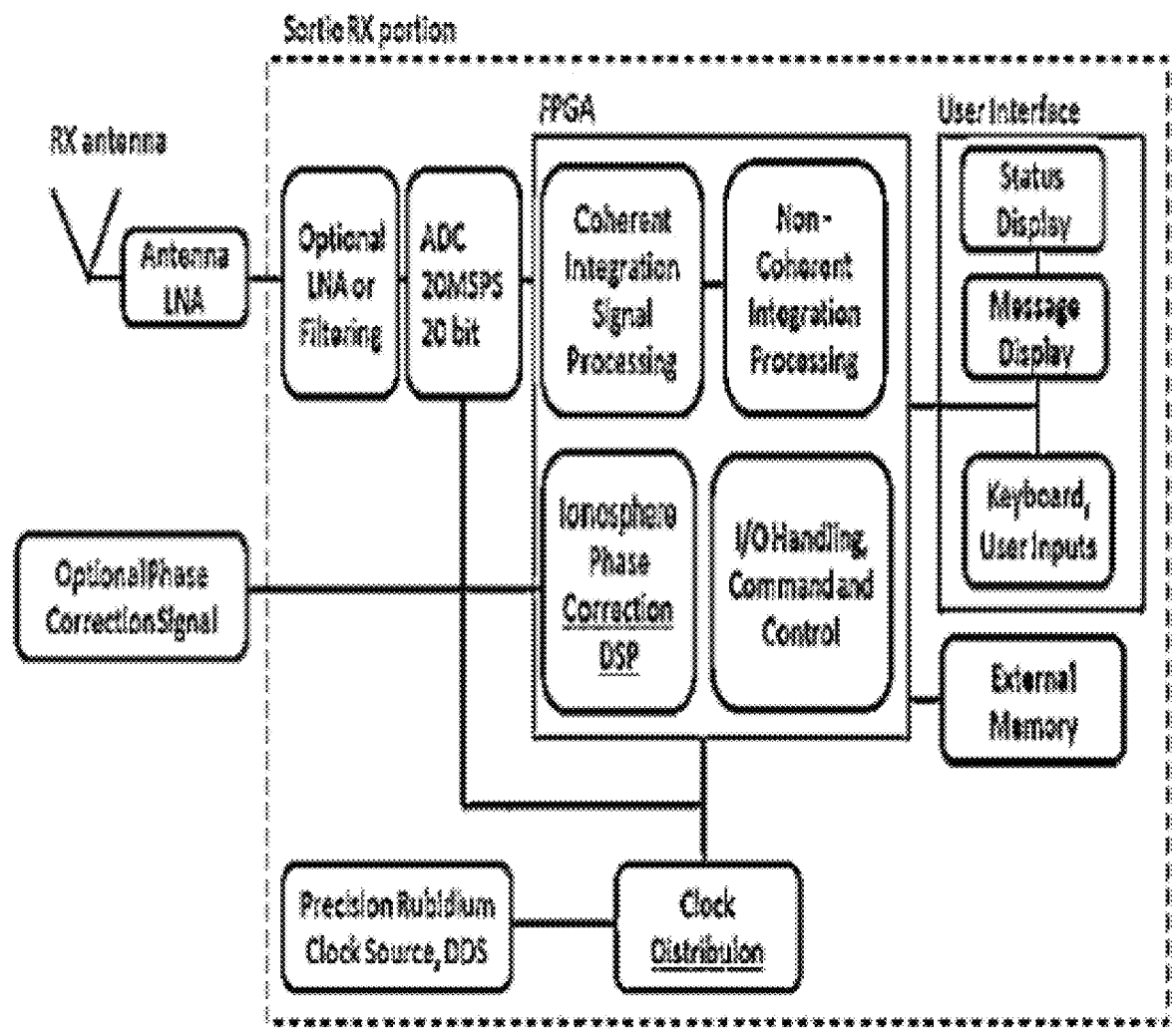
FIG. 15 is a block diagram of the receiver.
Figure 16:
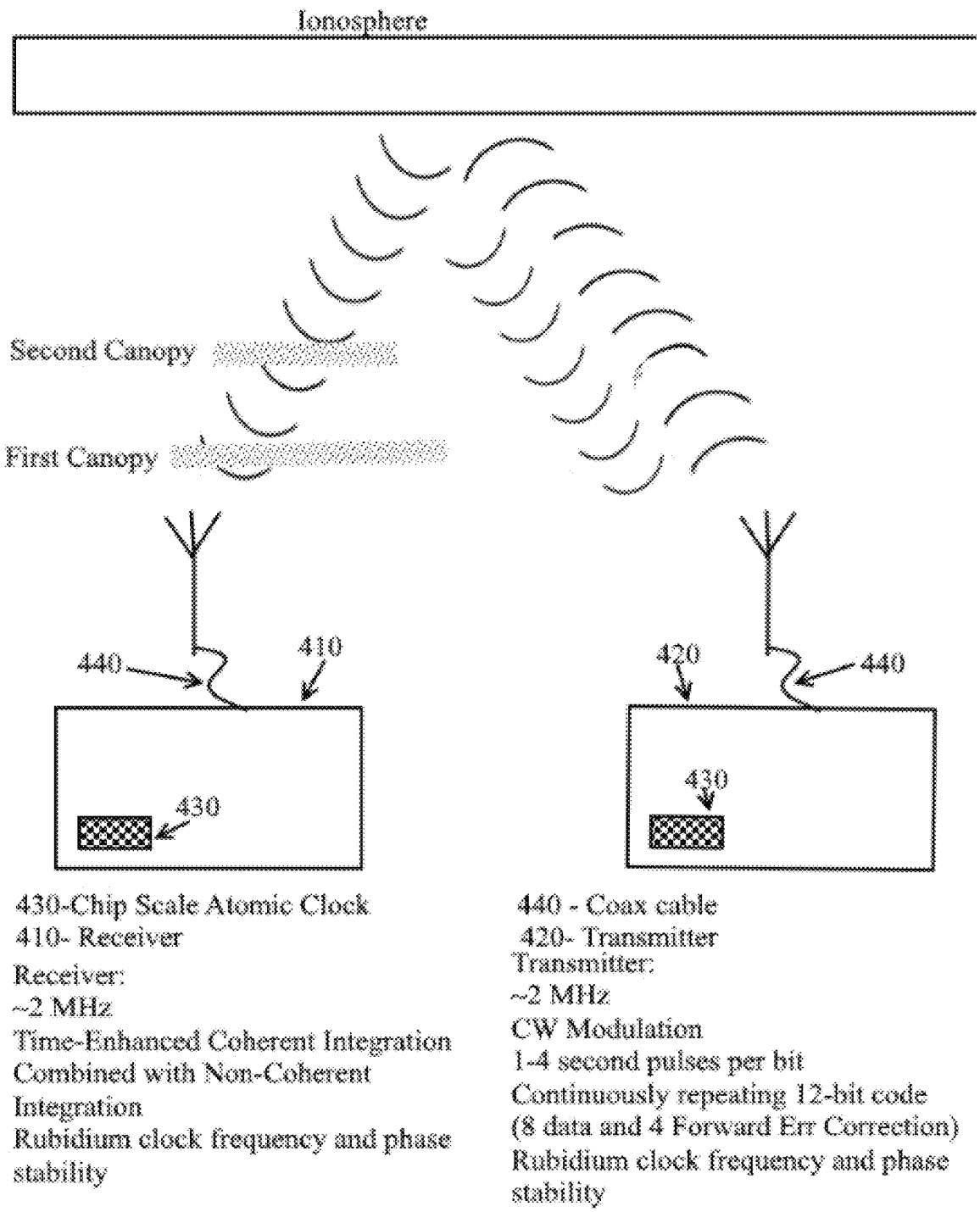
FIG. 16. Is a diagram illustrating reflection by the ionosphere.

Where a signal is reflected by the ionosphere, see FIG. 16, the key items of certainty, assumption, and simulation, i.e.

the starting point is Ionosphere average movement for phase change. Each bit lasts typically on the order of 1-8 seconds depending on the ionosphere movement probability distribution and frequency chosen. This varies across geographic regions, seasons, time of day, solar activity, and the 11 year solar cycle. FIG. 1 illustrates 8 bit transmission of 2 seconds. FIG. 2 shows the 8 bit transmission repeated at 2 seconds a bit. The faster the ionosphere movement the briefer the Time-enhanced Coherent Integration should be to recover the same signal. More transmissions and transmission time are needed for more non-coherent integrations to achieve the gain needed to detect and decode the signal. The average phase shift during a set of transmissions of a bit of information should be below around a maximum of +/−135 degrees, with preferably 0 degrees. Phase shift is primarily determined by wavelength and speed of ionosphere height change. Higher frequency has a shorter wavelength, which means more sensitivity to height shift because it changes phase more for the given distance change. ((Height-change length/Wavelength)*360)=phase change degrees. By way of example, a 4 meters ionosphere drift in 1 second/40 meters wavelength=36 degrees/sec. FIG. 2A shows the transmission of a substantially perfect sine wave a predetermined frequency with the varying phase shifts.

Figure 17:
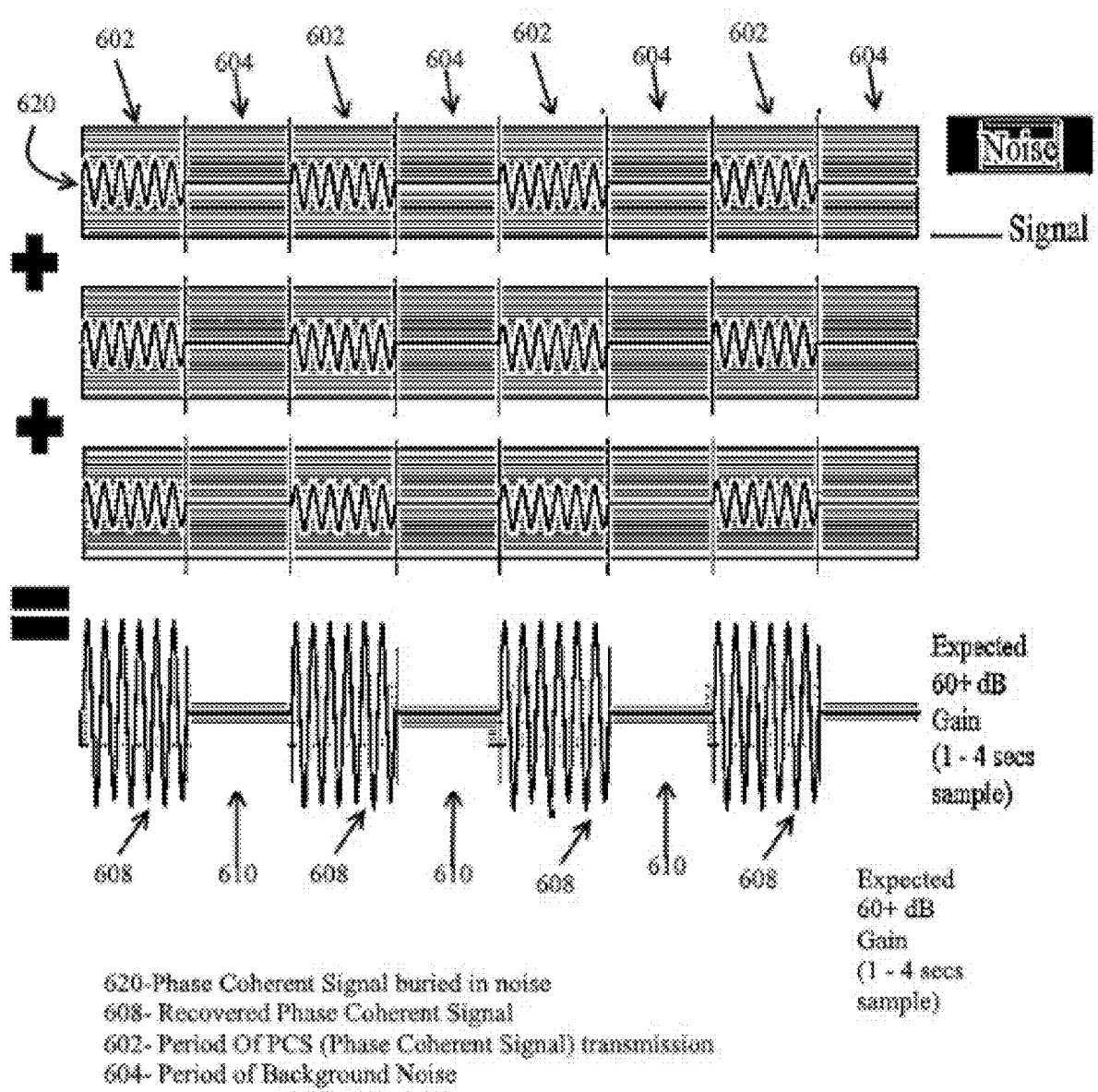
FIG. 17 is an illustration of multiple transmission of a signal in a noisy environment and the effect of time enhanced coherent integration.

An illustration of time enhanced coherent integration within a noisy environment is shown is FIG. 17. The pulsed signal 602 is spaced with a period of non-transmission 604. With multiple repetitions TeCI is able to increase the gain as shown in the integrated signal 608 as opposed to the noise period 601.

Some techniques to increase SNR of a transmitted signal and/or degree of message content follow:

Using the integration methods (Coherent and non-coherent) additional SNR and or data content (for example the number of bits contained in a message) can be generated using the following methods.

Note that if fewer bits are transmitted for the same amount of time and power, bits can be transmitted more often or for a longer duration to increase SNR. For example, if an 8-bit message is transmitted at 1 bit per second for 8 seconds, vs. a 4-bit message transmitted at 2 bit per second 8 seconds, the entire 4 bit message may be repeated twice and integrated twice thus increasing the SNR by a factor of 2 where fully coherent integration is used. Similarly, a 2-bit message can be transmitted-repeatedly 4 times for a 4× increase in SNR in the same time period. Using 2-bits instead of 8-bits in the same time period, but transmitted more often or for longer increases the SNR. Conversely, more bits can be transmitted at a lower SNR Heuristic Approach to Processing Enhancement Compensation Some linear phase shift constraints such as ionosphere caused degree of phase shift per unit of time or maximum phase shift speed combined with a heuristic such as trial & error (T&E) compensation attempts can further improve integration result using a trial and error approach of iteratively or recursively choosing sections of a integration period and phase shifting them by dropping samples then CI (coherently integrating) them. This can be used to improve CI SNR results.

Knowing the maximum ionosphere height change and thus phase shift change/sec can also usefully constrain T&E attempts. Knowing there will be none or few sudden discrete phase jumps also may usefully constrain T&E compensation attempts.

Increased processing power can be applied on Trial and error attempts (T&E) for various likely phase shift profiles such as linear profiles at a continuous average shift of 10 degrees/second to find the one that results in maximum gain and thus beneficially be used to achieve gain results.

Phase shift compensation attempts can be achieved when using an analog to digital converter (ADC) by slowly changing ADC sample clock rate frequency to match the expected or desired phase shift. Alternatively, the sample frequency can be maintained at the same frequency and periodic samples can be duplicated or removed to slightly change the frequency or phase. By way of example, if the ADC samples 8 samples/cycle and the frequency is 10 MHz sampled for 1 second, if 1 ADC sample is abruptly removed from the sample set of 10,000,000 at ~5,000,000 samples in, the phase starts out at 0 shift but is shifted by ⅛ of 360 degrees or 45 degrees by the end of the samples.

In addition, the Time-enhanced coherent integration can be combined with and complemented by enhancing the SNR as described below.

MEMS Oscillators

MEMS oscillators have several programmable features that improve system performance, including options for finely adjusted and tuned frequency output and waveform tuning. Customizable frequencies can be used to optimize performance by selecting the best output frequency for their application, which can be programmed from 1 MHz to 70 MHz, and out to an accuracy of $10^{-8}$. Instead of using voltage-controlled crystal oscillators (VCXOs) or digitally controlled crystal oscillators (DCXOs), MEMS oscillators have programmable pull range from ±6.25 parts per million (ppm) to thousands of ppm to support integration into control loops, including discrete jitter attenuator loops.

The pull-range flexibility of MEMS timing devices is created by using a fractional PLL rather than pulling the resonator itself with variable capacitive loading, as is done for most quartz-based VCXOs. Because of the limited quartz resonator pull range, quartz VCXOs are usually limited to a maximum absolute pull range (APR) of ±50 to ±100 ppm. The limited pull range of quartz devices reduces the applications they are able to support because a ±50-ppm VCXO, for example, would not be able to track a frequency can be within ±100 ppm.

Thus, due to its fine frequency control than a, a MEMS oscillator may be chosen to track or match to a varying clock signal such as one received based on the center frequency of a strong AM station.

Using Pulses of Power to Increase Snr

If the transmit time slot of a waveform pulse within a message of or a complete message is used to contain information, a receiver's trial and error attempts on receive time slots can be used to reveal that information. For example, if a signal is found in the 23rd second of every 100 seconds after the start second (ex. 1:00:00.000), where the signal is contained in 1:00:23.000-1:00:23.999 . . . 1:00:46.000-1:00:46.999 . . . 1:01:09.000-1:01:09.999 . . . and so on . . . ) of the hour, then the discovery of the presence of this signal in those slots using T&E creates additional information yielding the number '23'.

Note that the same power is required to transmit 1 second every 10 secs at 10× power in that 1 second as to transmit continuously at 1× power. (Ex. 10 watts for 1 second transmitted once every 10 secs=1 Watt transmitted continuously). However, if it is known only to receive during the 'active second' because the predetermined second is the active second for a synchronized transmit and receive, Valid data is then received beneficially at 10× the SNR or 10 dB. higher. The non-active seconds are known to contain only noise and CI (Coherent integration) of them in also would only reduce SNR. Alternatively, the other unused seconds can be used as active seconds for different or other communication channels.

Continuous Transmissions Vs. Periodic or Sporadic Transmissions:

The following scenarios illustrate various continuous transmissions and the SAME TOTAL POWER required.

Scenario A: transmitting 20 watts continuously for 1 second.

Scenario B: transmit 200 watts for 0.1 secs.

Scenario C: transmit 2000 watts for 0.01 secs.

Similarly, the relationship between power and time applies to 20,000 @ 0.001 secs and so on).

Practical Current Snr Maximum Achievable Limits

More slots and trial and error attempts increase processing requirements exponentially. Therefore, processing feasibility vs. computer power available is an issue.

In the tradeoff of the scenarios stated above the average power is unchanged. However, the instantaneous power increases to a point where transmitter, cabling, power supply, or antenna voltage and current limits MAY BE exceeded. The economically feasible point with current technology is based on the expense of the circuitry at higher voltage and current tolerances.

In the case of 10 MHz, the practical minimum duration limit is 1 cycle for 100 ns, i.e. 10,000,000× the power for $\frac{1}{10,000,000}$ the time.

If the above signal received is at 0 dB. relative to the noise floor in scenario A, then it would be 10 db above the noise floor in scenario B and 20 dB. above the noise floor in scenario C. The bandwidth however is different between them.

Alternatively, instead of transmitting continuously at 20 watts with 10 seconds per complete signal and repeat, transmitting at 200 watts for 10 seconds followed by a pause of 90 seconds with no transmission achieves the same average transmission power. However, received SNR beneficially increases 10 dB or a 10× increase in instantaneous power. The receiver would be configured to anticipate a transmission period of 10 seconds within a 100 second period and the time slot where it would occur and ignore the other 90 seconds where it is known no signal and only noise is present. Thus, the noise of the 90 seconds is not integrated into the signal and the signal is not 'diluted' by the noise, maintaining a 10 dB SNR increase. Similarly, a 20 dB or 100× improvement can be achieved by transmitting a 2000 watt signal for 10 seconds followed by a 990 second period of no transmission and no power draw. In this way a battery or power source of fixed watt-hours may maximize its power usage within a transmitter to transmit at a higher SNR. The battery must be able to efficiently provide the higher output power for the same time period. Alternatively, temporary storage of the battery power must be provided. For example, using a battery to charge a supercapacitor or a bank of supercapacitors.

A pulse transmission can encode information. By way of example, a pulse of an interval of $\frac{1}{100}$ of the time in Scenario C that occurs in the time slot 4, i.e. between $\frac{4}{100}$ and $\frac{5}{100}$ may contain an additional information value of '4' and may be transmitted/assumed, even though it's a single unmodulated pulse or the time location of a complete encoded message such as an 8-bit message.

SECURE COMMUNICATIONS If both transmitter and receiver are configured to only receive at specific time slots and the signal is buried below the noise floor, such as 30 db, observers looking at a broader average will have the data averaged down by the longer duration noise floor. However, where the transmitter and intended receiver only transmit and receive at the specific time slot, the receiver does not integrate the other time intervals where no signal is expected. Thus, the received signal SNR is many times higher. If both transmitter and receiver have a known semi-random or random or complex pattern, then they can use it to scatter the brief signal buried below the noise floor throughout the time domain.

Theoretically, an interloping receiver can receive all time segments at a specific frequency and using trial and error attempt to and reconstruct the hidden signal, but the number of combinations is enormous. If 100 sub-divided time slots within a repeating time allocation containing 100 sub-divided time slots are used, and for example 30 signals integrated together (coherently or non-coherently) are needed to receive and reconstruct the signal to exceed the noise floor, the combinations are approximately (100!/(100−30)!). Thus, it is computationally unwieldy.

Combining the above described simple periodic pulses of encoded power, with TeCI will allow the secure extraction a signal from the noise. The time slot from time enhanced coherent and NCI described above can contain a carrier wave CW coded signal, a repeated analog signal, a signal of any modulation, or an unmodulated pulse at specific times. This approach combines well with the time enhanced coherent integration and non-coherent integration to extract a repeated signal from the noise.

Similarly, the SNR enhancement method above can simply be used with Time enhanced coherent and non-coherent integration of encoded signals. This can significantly enhance their SNR.

Other/External Clock Sources:

For broader applicability, a relatively strong highly accurate phase coherent signal or even a less accurate signal can be sent and received for use as the basis for a clock source instead of or in addition to an accurate clock, atomic clock or GPS. Two (2) very low power stations can transmit and be received successfully as long as they can both receive the common accurate clock source signal or less accurate signal as a time base. One or more local clock re-transmitters can be used to boost the clock source. These boosters can be located anywhere or spread out around the globe. Alternatively, any strong but generally frequency accurate signal such as an AM or FM local radio station can be also be used as a clock basis. Due to the finite speed of light, and if the clock source varies in phase or frequency, the clock source variations are delayed but the clock source with its inherent variations can be stored in memory and replayed to compensate for the speed-of-light over distance delay. If the exact delay duration is unknown, a trial and error approach can be used in the receiver to establish the best delay period to use to integrate the signal and extract it from the noise. This is especially true if the transmitter, receiver, and or clock source locations are unknown. Here, a very fast ADC with many sample multiples over Nyquist is advantageous as past ADC samples of the received weak signal can be processed by duplicating or deleting samples to simulate phase or frequency adjustments. This is based on the received clock variation sample segments, the segment locations (and hence time delay locations) being tried and subsequently processed as part of the integrations on a Trial and Error basis to find the optimum match. This determines the time delay and the variations which may have occurred due to the received reference signal frequency or phase drift.

A synchronization signal can be transmitted to indicate start of message or a pattern matching approach can be used to match up received messages delayed differently in time for subsequent CI or CI attempts. Pattern matching must typically preserve the received signal in memory for later pattern matching attempts. Integration is done afterward in the receiver matching the pattern. The memory buffer preferred is slightly larger than the sample frequency times the estimated length of the maximum lightspeed propagation delay caused by the distance between transmitter and receiver. For example, for an 80 MHz Nyquist over-sample rate on a 10 MHz signal, with a lightspeed delay of 1 millisecond maximum, a minimum buffer of 80000 samples is preferred. Larger Past ADC data buffers and received clock buffers are recommended to try to reconstruct past data, but also require more processing power in more trial and error attempts;

Due to variations in long signal paths, signals will sometimes be delayed. Synchronization may be applied by software or hardware. This again may use a heuristic varying of phase or frequency to recover the signal aka message using CI.

Signal filtering in hardware or software such as a FIR filter may serve as an FFT replacement in the non-coherent integration signal detection phase. Circuit resources and receiver cost are reduced by multiple filters. Specifically, controlled delays or skipped-or-duplicated samples to filter individual frequencies such as CIC filtering. A comparison of the signal strength at a very narrow frequency band with the strength of an adjacent channel frequency nay be done to identify the presence of a potential signal for possible further CI processing. Alternatively, signal strength comparisons of various time slots instead of frequency slots can encode or receive a signal. The method herein can use a frequency basis or a time basis to encode and decode the signals. For example, instead of on and off at strictly 7 MHz, the signal may be 7000000.0 ON 1 sec, 7000000.1 ON 1 sec, 7000000.1 ON 1 sec, 7000000.0 ON 1 sec for binary transmitted code 0110. The length of samples integrated determines resolution bandwidth (RBW) of non-coherent integrating FFT. For example, 8 samples per cycle of a 1 MHz sine wave=8 MSPS=125 ns/sample. 8 Msamps for 1 sec may use a 1 Hz RBW, however 8 Ksamps=1 ms=1 kHz RBW. It is possible to use a low accuracy clock with far briefer signals integrated far more often to also achieve gain if the received signal is strong enough.

The synchronization may be by GPS-disciplined accurate clock references. However, it can be by WWV, WWVW, or CHU Canada time standards, or AM radio or shortwave stations.

In applications where both very low power transmitter and its receiver receive the same timing less expensive devices are made as opposed to employing a Rubidium clock and also requiring significantly less power. FIG. 2A shows a reference signal transmitter with antenna 320 transmitting the signal 310 that is received by the low powered transmitter 322. The transmission 340 is reflected at 319 that is at distance 331. The signal 340 travel with phase shift if any at signal 214 and is received by receiver 324. The receiver also receives the low power transmitter at distance 332 travels a similar pate and is also received by the receiver. The transmitter uses the received accurate pseudo-clock such as an AM radio station center frequency with a strong signal as a time reference basis. The transmitter creates its signal based on its clock being disciplined by the received accurate strong signal as a clock, generally as phase coherent as possible. The receiver receives the transmitted signal also based on the same semi-accurate clock and then integrates the transmitter's received signal. If the frequency accuracy of the received signal and transmitted signal or the phase drifts, then in one reconstruction mode the receiver matches the frequency or phase drift of the distant strong signal common to both, it then uses the integration technique to recover the signal that is below the noise floor.

In this way, a very low power transmitter signal can be received by remotely using a very simple inexpensive receiver while maintaining the phase by receiving and using a common coherent or a semi-phase coherent reference signal as a clock signal.

Typical Rubidium clock accuracy can achieve approximately 150 secs of phase coherence at 7 MHz. This accuracy results in 15 secs of coherence at 70 MHz, 1.5 secs at 700 MHz, or 1 sec at 930 MHz. Repeating the same Phase coherent signal of 1 sec length then non-coherently integrated would work to increase the range by increasing SNR. Similarly, 1500 secs of phase coherence can be had at 700 KHz, in a linear relationship.

In another embodiment simple inexpensive low power internet of things (IOT) devices can transmit a distant signal using the teachings herein. This is especially true for IOT devices which perform energy harvesting in addition to a battery or to supplement a battery from, for example, solar cells. A supercapacitor may be used to store the energy for higher power intermittent bursts of RF signal, offering the same average power but at a higher SNR as the receiver ignores the noise occurring during the non-transmission periods.

Another embodiment using a cell phone frequency signal can be repeatedly sent based on this approach. A 930 MHz is a 1G cell phone frequency and is useful to send simple emergency messages. In an emergency, the receiver tower can respond with a much stronger signal to be received by the weaker cell phone. A signal geolocating technique may be used to aim a high gain antenna towards the weak signal cell phone to communicate a response. A $10^{-9}$ or $10^{-19}$ accurate clock or signal source can maintain phase accuracy with a 930 MHz transmit signal for at least 0.5 secs or better. A cell phone tower and cell phone can both use the frequency discipline of a received GPS signal, for timing and frequency accuracy.

Multiple cell phone carriers employ frequencies in the 800 MHz to 900 MHz bands, with some in the 700 MHz band. These lower frequencies can maintain phase accuracy for a given clock source or timing source longer than higher cell phone frequencies. This reduces phase coherence inaccuracies during a Ci integrated transmission between the transmitter and receiver to cause phase shift between them larger than ~135 degrees. This is excessive and greatly diminishes and can even negate the constructive coherent integration's enhancing the signal SNR.

The clock source may be used to provide an accurate basis for the transmitting frequency using one or more of a frequency multipliers, a phase locked loop, and a direct digital synthesis (DDS) or Xilinx MMCM module method such as that employed in an FPGA.

In another embodiment, a high gain highly directional antenna may be used to acquire a distant clock source signal. The same received clock frequency may be used as a basis to retransmit a signal to a receiver. A second high gain highly directional antenna may be used and aimed towards the remote selected receiver. Alternatively, an omnidirectional antenna may then be used to transmit to multiple receivers or receivers in unknown locations.

In another embodiment, all receivers may have a relatively inaccurate clock, but the initiating transmitter of location A establishes the clock frequency using a periodically transmitted high power signal and the others 'lock in'.

Subsequent intermediate transmissions are at lower power. The issue of 2 or more transceivers having separate internal clock sources with frequencies that do no match is eliminated. Also, a less accurate inexpensive clock source can be used in all member transceivers in the linked chain.

In another embodiment, two (2) or more transceivers may communicate using substantially phase coherent integration and repeated signals with less power, more distance, or more certainty by using the following methods. Location 'A' transmits at frequency 1×, location 'B' receives the transmission and uses it as a clock to transmit it at a different frequency such as a harmonic (such as the 3rd harmonic) or a synthesized frequency received from location 'A'.

Cell phone bands in current use are suitable. The bands include, but are not limited to, the selected frequency transmit/receive allocation:
3G: 800 MHz ESMR, 3G 900 MHz (GSM-GPRS/EDGE/UMTS/HSPA/HSPA+),
4G: 700 MHz Lower Block A,
4G: 700 MHz Lower A/B/C 2/4/5/12 (LTE),
4G: 800 MHz ESMR.

However, higher or lower frequency bands such as 433 MHz are also feasible, especially for IOT type devices. A high gain highly directional antenna may be used to acquire the external clock source.

If a signal is not reflected by the ionosphere or similarly unpredictable moving medium, the coherent integration time can be maintained for a much longer period, creating higher SNR due to a higher ratio of coherent to non-coherent integration time.

Accurate clock sources also include, one or more each or in combination for enhanced accuracy or selected for best accuracy: satellite based units such as GPS, Beidou, Galileo, and GLONASS or the like. Inexpensive transmitter units may only receive local AM broadcast stations and use them as a clock source. The receiver may use the same AM station to match the clock of the transmitter more accurately. The receiver's received clock signal may be shifted in the time domain to more accurately match the transmitter's received clock signal and received signal which is using a sample of the earlier clock source which may be at a slightly different phase and/or frequency. These shifts may be attempted on a T&E basis to find the best fit and hence best SNR.

Another embodiment using an optical clock is well suited to this application due to its accuracy, producing ticks paced at 22 gigahertz—about twice as fast as those of cesium-based metronomes. But because the optical clock's gigahertz ticks are based on the much shorter, terahertz beats, they're far more precise than the gigahertz ticks of cesium clocks. The duration of each second counted out by the chip-scale optical clock (at 385 Trillion Hz) matched to every other, to around five trillionths of a second. That is about 50 times better than the current cesium-based chip-scale clocks.

An example of a 10 db improvement by transmitting the total average energy for a 100 second period in 10 seconds with the remaining 90 seconds not being allocated any energy for transmitting. The receiver integrates only the 10 seconds periods when the transmitter is transmitting and ignores the 90 seconds of no transmission. The 90 seconds have no useful content, only noise and therefore ignoring it and not integrating it prevents diluting the valid 10 second signal with the 90 seconds of noise. The receiver and transmitter may be preconfigured to 'know' that the 10 second transmission starts only on seconds of the day which are modulo 100 of the starting time-of-day, for example 00:00:00, 00:01:40, 00:03:20, . . . , etc. Alternatively, they may both be preconfigured to start at an offset from these starting points such as 1 second.

In the example above a 10 second transmission may consist of 8 1-second bits and 2 parity bits for a total of 10 seconds.

Alternatively, the receiver may use T&E and additional processing power to 'find' the proper offset amount and/or the proper repeat time interval and/or the proper transmission duration and/or the proper frequency slot. The correct matching T&E will result in the highest SNR and hence finding the signal buried in the noise the fastest.

The above parameters, but especially the offset and frequency slot, may be used to encode more information or bits. In this arrangement the receiver does not pre-know the frequency and/or the time-offset slot. The code to be transmitted may also include (or solely include) these parameters. A 10-possibility time slot X and a 52-possibility frequency slot yields a 520 possibility combination. This may be used to generate an additional 9-bits of data as 2 raised to the power of 9 (i.e. 2^9)=512. The added 9 bits are encoded at the transmitter unknown to the receiver and the receiver must use processing power to employ combinations to 'find' the correct slots used by the transmitter and hence find the additional 9-bits of data. These data bits may be message bits and/or parity bits or a combination of both. The message may consist of a single cony transmission period wherein the data is encoded solely in the slots chosen for that transmission period.

Alternatively, the slots may be pre-determined for both transmitter and receiver. However, the signal is hidden from an interloper, forcing them to use much more computing power and memory space to find the message. Since the message is below the noise floor for a number of iterations and integrations, therefore it may not be present or may only be found after a long duration of integrations.

Here the more processing power for a long duration of time domain data can be applied to extract the desired signal buried within the noise. Greater processing resources are needed to find and extract a signal which is deliberately hidden or in which additional bits of data are hidden in the transmit characteristics described above, one or more each or in combination. The larger the range of possible Time, Frequency, Phase patterns, the larger number of possible implicit coding combinations and the larger the computational resources needed.

Alternatively, the Time, Frequency slots may be deliberately scattered in a more complex pattern to either more deeply hide the signal or encode more bits into the message using no additional power to transmit, only additional power at the receiver to process and decode.

Figure 18:
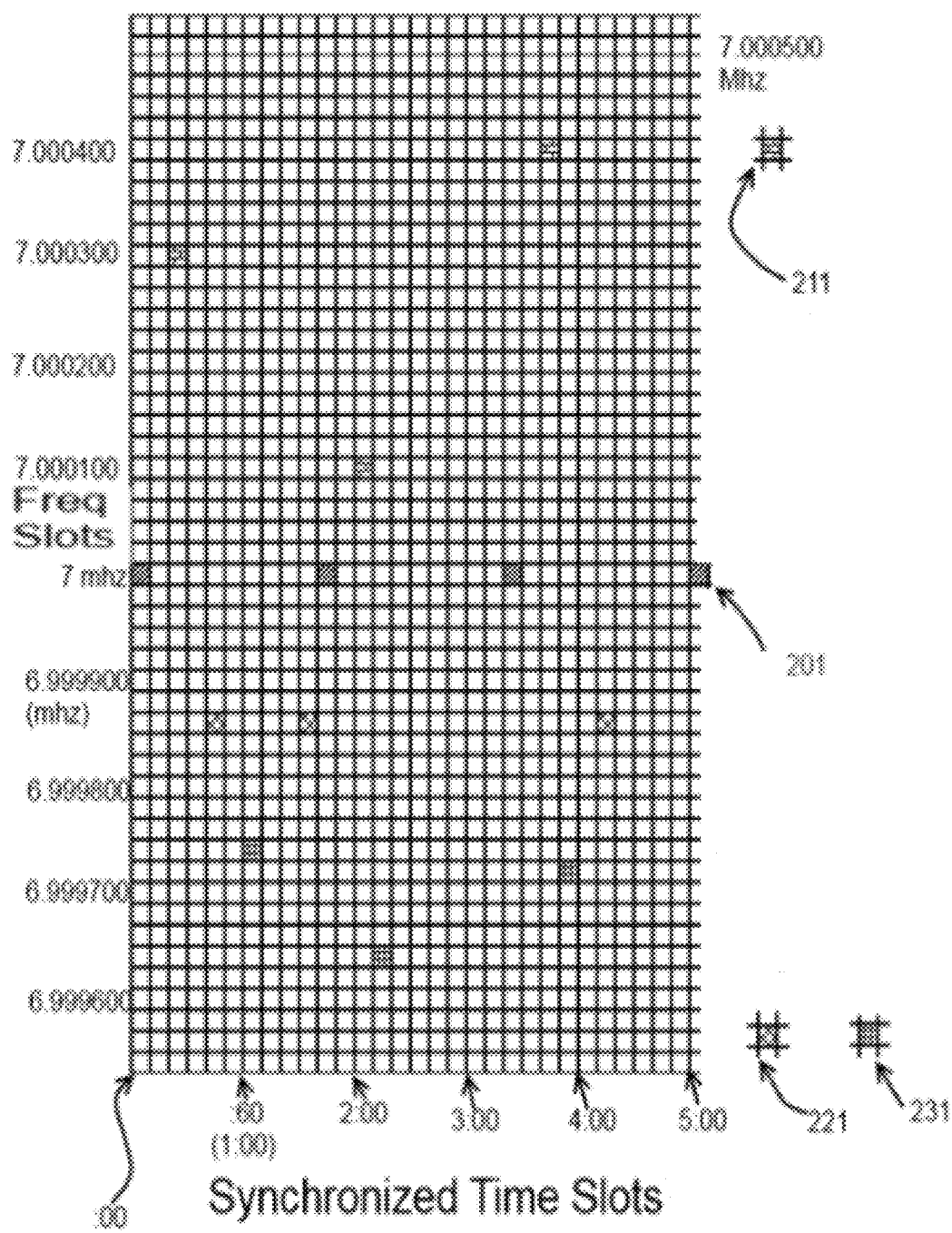
FIG. 18 is diagram of frequency and time slots.

In FIG. 18 an encoded signal 211 for obfuscation purposes or for information adding purposes. In the case of encoding for information purposes, the additional Time displacement code is shown as a resource to be appended to the bits of information and/or the parity check or Forward Error Correction code. Shown is a time displacement code of 2. Further shown, the code also shown as a frequency displacement code pattern. It may also be used as an obfuscation pattern if it is pre-known to both transmitter and receiver.

FIG. 18 shows Frequency-Time locations 221 of a time slot obfuscated signal, wherein both transmitter and receiver know the expected time slots to be used and are synchronized.

Frequency-Time locations 231 of a time slot and frequency slot obfuscated signal, wherein both transmitter and receiver know the expected time slots and frequency slots to be used and are pre-synchronized in time-of-day and frequency calibration substantially better than 10E−6 or 0.0001% frequency accuracy.

Such patterns may include the time slots and/or frequency slots used be sequentially based on the digits of an irrational number or rational fraction, or several such numbers, or prime number sequences, or other encryption or hashing techniques. For example, the transmission frequency slot may be based on Pi (3.14159 . . . ) wherein the transmitter may first transmit at 3×100+7000000 Hz, next at 1×100+7000000 Hz, then at 4×100+7000000 Hz corresponding to the 1st 3 digits of Pi, 3 then 1 then 4, . . . , etc. The encoding may wrap around such that 7.0 MHz=(codes to) '0', 7.0001 MHz='1', 7.0002 MHz='2', 7.0003 MHz='3', 7.0004 MHz='4', 7.0005 MHz='5', 6.9996 MHz='6', 6.9997 MHz=7', 6.9998 MHz='8', 6.9999 MHz='9'.

Alternatively, a semi-randomized, pseudo randomized, or fully randomized Time-Frequency pattern may be chosen to obfuscate communication. Some combination constraints may be pre-determined for the receiver (ex. the 1st 2 time-frequency slots) but others randomized so that even an/or one or more of the authorized receivers may need processing time to decode the message in addition to integration time.

Uses for this include sending an encryption code securely and separately or sending a message where the receive is delayed until sufficient integration time is expected to be needed to occur in the receiver.

The closer the proximity of the receiver is to the transmitter or the greater the transmitter power, then less integration time is needed. Conversely, more computationally powerful receivers may be located at a greater distance. An encoding scheme may be chosen to add computational depth due for a substantial volume of random time-frequency content, therefore favoring more distant more powerful receivers. Similarly, few or no random time-frequency content or elements may be added to favor nearby receivers.

A signal strength may similarly be deliberately reduced to prevent receipt of the message 'too soon'. A deliberately configured directional antenna may be configured to favor reception of a signal by receivers located in one or more specific directions.

Energy harvesting means such as a solar cell, a battery, or supercapacitor can be used to store the accumulated energy to be used for transmission for a brief period or a periodic higher power transmission to achieve a higher SNR.

Multiple transmitters located in separate known locations and synchronized to transmit the same phase coherent message may be used to create geographic 'dead spots'. Using omni-directional antennas and transmitting deliberately out of phase to create regions of constructively reinforced interference signal and other regions of destructively reinforced interference signal. A valid receiver, i.e. an intended receiver, in this case must use a directional antenna aimed towards location or the direction of the transmitter to receive a signal, or be in a location where the signals are reinforced. A complex pattern of phase shifts may also be used to create moving dead spots or moving reinforced spots in specific geographic locations. The moving spots favor one set of moving vehicles traveling along a specific path at a specific speed while reducing, inhibiting or preventing others moving at a different speed or along the wrong path from receiving the transmissions. A more directional antenna(s) may similarly be aimed, powered and or radiation-pattern chosen to enable more options in crafting regions of reinforcement and dead spots. Directional phase-shifted antenna arrays may be used to also achieve this.

A method of achieving sufficient phase coherence Is as follows when transmitter and receiver are located at a great distance and phase changes due to change in propagation characteristics such as ionosphere drift, sporadic E activity, grey line onset, or the like occur. Both transmitter and receiver use a pre-determined high power broadcast station as a reference signal standard. The reference signal is received by both. The broadcast station is substantially near the transmitter in location and at a frequency and phase of the reference signal standard. If the transmitter is near the high power transmitter such as a shortwave broadcast station, the transmitter receives and uses receives the high power broadcast signal as a frequency and phase reference to transmit its signal at a different frequency. The distant receiver also uses the high power transmitter as a frequency and phase reference. Because the path taken by both the high power station and the low power transmitter are substantially the same and the frequency is very close. Also, the refraction and reflection of both signals is substantially the same. Thus, the remotely located receiver can maintain phase coherence for coherent integration purposes for longer than without the phase reference clue being provided. The preferable frequency range is 1.5 to 30 MHz and shortwave frequencies.

A heuristic approach can be used by the receiver to find the best match of time-delayed frequency and phase reference from a reference source such as a strong AM station signal received and used by both or a distant shortwave station located near the transmitter but far from the receiver and similarly heard and used by both as the reference source.

Sine wave 302 represents a substantially sufficient power sine wave at the frequency transmitted by the reference transmitter 320 which should be transmitted but may be not due to transmitter clock inaccuracies. It should be noted that AM radio broadcast standards in the USA state AM stations should be within +/−20 Hz of their FCC allocated frequency. This is inaccurate for applications approximately above 10 MHz. and ranges beyond 10 miles at about 0.1 watt transmit power as a simple clock reference source, at 1 MHz represents an accuracy of $20/1000000$ or 20 ppm or 0.000020 or 0.002% or 2×10e−5. This thus requires a short CI integration time and long NCI (non-coherent integration) integration time. This is far less than the accuracy of 10E−8, 10E−9 or better of an atomic clock or more accurate clock source.

FIG. 2A shows a sine wave 304 shows an exaggerated representation of an imperfect sine wave transmitted by the reference transmitter 320 which may continuously or semi-continuously vary in frequency and/or phase from the Sine wave 302 in various regions due to the reference transmitter's clock inaccuracy, excessive Allen deviation, ionosphere height drift, or other factors.

Reference transmitter signal 310 transmitted towards the receiver 324 from reference transmitter 320 goes thru time-of-flight path 340 and a region of possible added phase shift 319 to get to receiver and receiver antenna 324. Similarly, transmitter signal 312 transmitted towards the receiver 324 from low power transmitter 322 goes thru time-of-flight path 342 and a region of possible added phase shift 319 to get to receiver and receiver antenna 324. The region of possible added phase shift 319 is substantially common in location and properties to both signals 310 and 312 and thus any phase shifts occurring in region 319 are substantially common to both.

The region of possible phase shift may be the ionosphere, or a moving object which reflects both signals. Although time-of-flight path 340 and time-of-flight path 342 are shown as straight lines, they are straight lines for convenient representation only, and may be reflected or refracted at various angles in the path between transmitters 316 or 322 and receiver 324. Signal 314 and 316 thus are substantially similarly modified by region 319 and have common phase shifted properties. The time-of-flight distance #1 between low lower transmitter 322 and receiver 324 is different from time-of-flight distance #3 between Reference signal transmitter 318 and receiver 324 by distance 332. This shifts all phase shift and frequency shift characteristics of 310 by a constant time.

The reference signal 318 is received by 322 before being used as a frequency reference for a frequency conversion circuit such as a phase lock loop (PLL) or voltage controlled oscillator (VCO). Thus, the frequency and phase drift reference 'information' embedded as a basis for the signal 312 and traveling along path 342 will most likely arrive at a different time than the reference signal 310 along path 340.

The reference signal 310 arriving as signal 340 is stored in the time domain in receiver 324 as is signal 312. The appropriate delay or time shift difference between 314 and 316 must be found and can be found using a T&E approach until signal 312 is extracted. Thus, various whole displacements of the reference signal with the signal 312 are iteratively or recursively tried until a match or the best match between reference signal time-frequency-phase basis and received signal yields the highest SNR, this shift then subsequently being used and enabling the message to be extracted from the noise the soonest.

Displacements can be achieved by shifting stored ADC or down converted samples of 340 relative to stored samples of 342. The shifts may be forward or backwards depending on the distance of 320 to 324 vs. the distance of 322 to 324.

The reference signals coming from transmitter 320 are used by both 322 and 324 to discipline their local oscillators and ADC converters and transmitters. A GPS, atomic clock, or similar can be used as an initially to provide a stable clock signal. The reference signals are then used to vary or further discipline the clock. This maintains phase coherence for the longest time possible and attaining the longest coherent integration time possible based on the slight differences in paths 340 and 342 and disruption going thru 319. After the longest time for coherent integration is found, for example by maximum SNR achieved by a heuristic approach, the non-coherent integration can be applied to further extract the signal from the noise.

It should be noted that local AM stations should be encouraged to employ an atomic clock to accurately transmit their fundamental frequency and enable the above receive enhancement methods with greater accuracy and hence range or lower power.

Prescribed selected or semi-randomized phase shifts in the transmit signal may also be used to obfuscate the signal by phase cancelling the time based coherent integration signal with itself. For example, an earlier part of a 1 second signal for a bit (the 1st ex. 500 ms) may be 180 degrees out of phase with the 2nd (ex. 500 ms) half of the 1 second signal. This can be used in a similar manner as an orthogonal separate dimension to time and frequency slot to provide obfuscation or provide one or more added codes, which can be computationally decoded or discerned. This requires a combination of enough processing power or with sufficient fore-knowledge of all or part of the expected pattern.

For example, in a repeated 1 second transmission,
the first 100 ms may be transmitted at the reference phase of 0 degrees;
the second 100 ms may be transmitted to shift the phase 180 degrees;
the third 100 ms may be transmitted to shift the phase 0 degrees;
the fourth 100 ms may be transmitted to shift the phase 180 degrees;
the fifth 100 ms may be transmitted to shift the phase 0 degrees;
the sixth 100 ms may be transmitted to shift the phase 180 degrees;
the seventh 100 ms may be transmitted to shift the phase 0 degrees;
the eighth 100 ms may be transmitted to shift the phase 180 degrees;
the ninth 100 ms may be transmitted to shift the phase 0 degrees; and
the tenth 100 ms may be transmitted to shift the phase 180 degrees;

The above combined with the frequency slot encoding method and time slot encoding method increasing the number of combinations and hence the total information content such as the number of bits effectively transmitted.

The above may be used to transmit a 1010101010 bit pattern, wherein as the signal is below the noise floor, the receiver may use a heuristic combination of phase shift compensation to extract the bit pattern sent. The heuristic combination with the highest signal strength is seen as the proper bit pattern. A pre-determined coordinated start time for the pattern, pattern number of bits, and pattern duration is again useful to decode the message faster. It must be noted that an extremely high computational effort can be used to extract a finitely complex Time-frequency-phase pattern from below the noise floor, but the computational effort increases exponentially.

Multi-level SNR depth patterns using known regions of repeated same values within a signal. For example, the 1st bit value may be repeated 4 times in 4 slot positions, thus this bit value can be integrated more rapidly than bit values which are represented by only 1 slot position. In this way a broadly ranging message 'depth' can be sent with initial values being discerned first, then later a larger quantity of briefer values are discernable, with more and more time needed for greater detail and more total data.

The initial repeated values may be used to indicate a (ex. preestablished and known to both transmitter and receiver) code chosen to indicate which one or more decoding algorithm, frequency pattern, time pattern, and phase pattern to look inside to more rapidly receive, integrate and decode the signal—as clues.

Alternatively, a set of messages may be sent wherein some digits are pre-determined to be repeated and others are known to be parts of additional messages to be decoded. For example, a 32-bit data content message may be sent wherein the 1st 4 bits are always sent as '1' and hence decoded first, the 2nd set of 4 bits indicate an auxiliary message number 1-16, the 3rd set of 8 bits are the auxiliary message content, and the remaining bits are used for parity bits or Forward Error Correction bits. As an example, the messages allocation % and a message allocation pattern may be preestablished and known to both transmitter and receiver and the synchronization and times pattern for each message type may be predetermined.

Example message types sequence pattern sent over time repeatedly may be preestablished to be:
Message containing Auxiliary message 1;
Message containing Auxiliary message 1;
Message containing Auxiliary message 1;
Message containing Auxiliary message 2;
Message containing Auxiliary message 1;

Message containing Auxiliary message 1;
Message containing Auxiliary message 3;
Message containing Auxiliary message 1;
Message containing Auxiliary message 1;
Message containing Auxiliary message 1;
Message containing Auxiliary message 4;
Message containing Auxiliary message 2; and
repeated.

The above sequence of 12 messages repeat until, for an example, the receiver transmits a message indicating the message is received or a sufficient portion of the message has been received with sufficient likelihood of accuracy. As seen from above, Messages containing Auxiliary message 1 will be received first, they are $8/12$ or ~66% of the messages. Messages containing Auxiliary message 2 will be received second, they are $2/12$ or ~16% of the messages. Messages containing Auxiliary message 3 and 4 will be received last, they are each $1/12$ or ~8% of the messages.

A possible message content of each example may thus be:
Bits 1-4: the same bit values sent every message for fastest reception and integration-based decoding, (ex. 1011)—16 possible message categories or status codes as a usage example. This is the data that is typically most important or must get through the soonest;
bits 5-8: different bit values sent indicating the auxiliary message number of the message chosen by the transmitter operator being sent in the bits that follow (ex. 0001, 0010, 0011, 0100) message number 1 of 16 possible using 4 bits as message number;
bits 9-16: auxiliary message sent corresponding to or associated with the message number 1
   (ex. 10111010): bits 9-16: auxiliary message sent corresponding to or associated with the message number 2
   (ex. 01110010): bits 9-16: auxiliary message sent corresponding to or associated with the message number 3
   (ex. 10000010): bits 9-16: auxiliary message sent corresponding to or associated with the message number 4
   (ex. 01110111): thus, the following message sequence is transmitted repeatedly.
1011000110111010 (message 1) message seq no. 1;
1011000110111010 (message 1) message seq no. 2;
1011000110111010 (message 1) message seq no. 3;
1011001001110010 (message 2);
1011000110111010 (message 1);
1011000110111010 (message 1);
1011000110111010 (message 1);
1011001110000010 (message 3);
1011000110111010 (message 1);
1011000110111010 (message 1);
1011000110111010 (message 1);
1011010001110111 (message 4);
1011001001110010 (message 2) message seq no. 12 transmitted repeatedly.

Instead of a binary CW signal being sent, an analog time domain signal such as an AM modulated signal may be repeated over and over and integrated coherently or non-coherently to enable eventual reception by the receiver. The same message start time, duration and frequency may be predetermined for the transmitter and receiver and the receiver may use time enhanced coherent integration to integrate the same message over and over repeatedly until the message is judged to be received with sufficient clarity by the operator or until the message's SNR exceeds a predetermined SNR threshold—being measured continuously and automatically.

Using the above technique, the best results are achieved if both transmitter and receiver are in a fixed location and there is no substantial variance in the signal path length due to it bouncing off the ionosphere or other moving mediums or objects such as vehicles in a multipath RF reflection environment. Phase coherence can be maintained to a higher degree in these circumstances.

Multiple receivers or multiple receive channels may be used to try to more quickly receive the signal by the receiver at different frequencies—if they are present.

Uses of the teachings herein may include helping friends find each other at a ski hill, track wildlife, geolocate ships, follow yacht races, monitor bike rentals, while tracking numerous things like drones, rental cars and trains.

It is important to note that optimal receive speed results when synchronization between the transmitter and receiver is established. This is typically a Time-of-day (TOD) synchronization so the transmitter starts a next bit transmission at the beginning of a specific second for example, and the receiver expects a new bit to similarly start and hence begins integration for the next bit at that time of day boundary. It is important to note that frequency accuracy (ex. $10^{-7}$ to $10E^{-9}$ or better) is very important for time enhanced coherent integration to maintain phase similarity over extended periods of time from seconds to minutes typically, but for example Time-of-day synchronization need only be accurate to $10E^{-5}$ if the transmit-receive effort begins only a few hours or minutes after synchronization occurs. An astronomical means may be used to resynchronize Time-of-day.

A heuristic may be used to recover synchronization, by using start times of bits or messages to be computationally integrated and attempted at fractions of seconds within a second until the strongest signal strength is found indicating the correct framing of the starting time of the signal occurred.

TOD synchronization (TODs) may occur between transmitter and receiver directly, such as transmitting a synch pule or time of day from one to the other, the TOD receiving unit resetting its clock to match the newly received TOD. Alternatively, TODs may be achieved by both units receiving a synchronization from the same or a different time standard such as a GPS time or WWVW/WWV/CHU time signal.

Described herein is a process of hiding transmitted data. Among them are: power pulse and frequency allocation interact, mixed, preestablished or 'encrypted' start times appears sporadic. Described herein is frequency jumping and time—using a preestablished pattern such as prime numbers or pi digits signal spread between multiple frequencies.

Described herein is a Phase modulation pattern to cancel and hide messages: phase modulation, frequency or start time based on externally received signal in common with receiver and transmitter or from the receiver) described herein is how a message could be split between time and frequencies to increase the encryption.

If location of receiver known relative to transmitter, then phase compensation and doppler shift compensation of signal can be done. Alternatively, a heuristic approach by receiver can be done to find best match to transmitted signal as it varies.

Receiver may use processing power or a heuristic to find and receive the transmitter encryption code or frequency, phase, or time schedule code, then use the time schedule code to more quickly receive subsequent transmissions AM radio phase shift common to both the transmitter and the receiver can be stored and compensated for partially, based on heuristic example.

An embodiment of a device and method is envisioned wherein an accurate clock source can be used to amplify or detect a very weak signal, especially one below the noise floor. Detection of the signal is by a coherent integration technique. This is facilitated if the weak signal is also very accurate in terms of low Allen Deviation, or if a varying but using a common clock source.

However, if it is not as accurate and varies, typically it varies in a semi-predictable, known, estimated, or substantially estimated in a heuristic fashion. This may be because Its variation is constrained. It does not randomly jump from frequency to frequency. Thus, a heuristic, linear extrapolation, interpolation, or non-linear extrapolation or linear interpolation can be used to determine how the clock source varies. For example, a typical crystal oscillator is known to vary with temperature. The constraints allow T&E enhancement more quickly while using less processing power.

Other enhanced T&E approaches include trying a range of frequencies slightly higher and slightly lower than the current ref frequency. As received the frequency changes, A better match better match indicates the frequency difference and a better fixing of the new reference frequency.

It should be noted that other methods of coherent and non-coherent integration are also contemplated in this invention, however the methods described herein are very computationally efficient for CPU processing time, FPGA processing energy, or memory efficiency than other methods.

A similar or common problem exists in finding a weak signal modified but of a semi-fixed frequency buried in noise. The signal may be modified by phase or doppler frequency shift. The doppler shift can be caused by reflection off the ionosphere, transmission of reception from a moving vehicle, or unmanned aerial vehicle (UAV). Also, the doppler shift can be caused by a fixed transmitter and a moving receiver. Both transmitter and receiver may be moving causing a doppler shift. Either transmitter or receiver may move briefly potentially causing a 'permanent' phase shift depending on wavelength and relative distance and direction moved between them. A frequency shift of a crystal oscillator may be caused by temperature, humidity, surface adsorption, desorption, pressure, vibration, magnetic field, electric field, load, driving electronics changes, load capacitors changes, load stability, voltage supply stability, and radiation. Any knowledge of the constraints' behavior can be used to decrease processing power and/or time trade-off and 'find' the signal faster.

Knowledge of constraints include long-term aging, short term stability, mechanical stress, vibration or shock, gravitational orientation, acceleration, and deceleration also effect the oscillator frequency.

A stationary intentional or unintentional transmitter relying on a crystal for its local oscillator similarly may shift in frequency as its surrounding temperature changes or its self-heats internally due to operation when turned on and drawing current and power.

All of the above can be detected with more sensitivity using the approach described herein.

Figure 19:
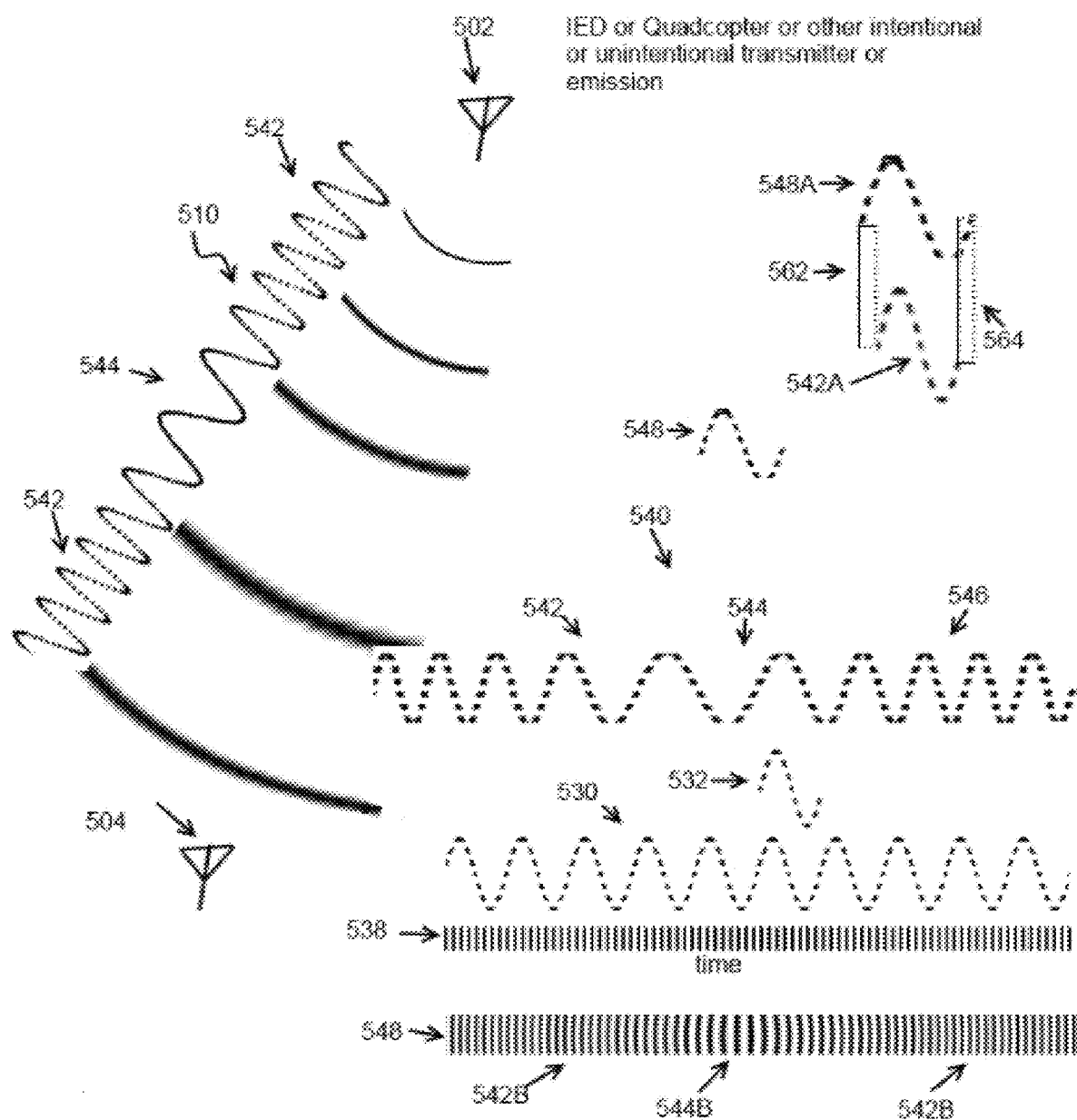
FIG. 19 is a frequency or phase variant RF emitter.

FIG. 19 shows an example of a frequency or phase variant RF emitter 502 and a receiver 504 capable of high frequency accuracy and a signal 510 between them, whose frequency and or phase changes due to one or any of the disruptive factors listed above. The signal 510 is exaggerated in wavelength/phase/frequency change or distance for illustrative purposes as is most depictions shown in the figures herein.

Precision digitized signal 530 is shown wherein the ADC clock rate matches a greater than Nyquist multiple of the needed sample rate. For example, only, if a sine wave of 1 MHz is received and to be processed, a 4 MHZ sample rate (4 samples/cycle) is recommended at a minimum, a larger multiple is preferred such as 8× (8 samples/cycle) or 16× (16 samples/cycle). An individual sine wave 532 of sine wave train 530 is shown in detail in 532 wherein a 12× (12 MHz sample rate or 12 samples/cycle) shows the points on the sine wave where the ADC samples occur. A rubidium clock typically is used as a frequency standard in a Xilinx FPGA MMCM module, DDS (Direct Digital Synthesis) or PLL (Phase Locked Loop) in a typical FPGA, discrete circuit or ASIC, for example, to generate the precision 12 MHz signal for the ADC to sample the received precision 1 MHz signal 530 or single wave within 530 as single cycle 532. The samples in 530 are then typically Coherently integrated.

Precision digitized signal 540 is shown wherein the ADC clock rate matches a greater than Nyquist multiple of the expected base needed sample rate (542) (546), but also generates a sample rate interval of shifted phase or lower frequency (544) within a portion of it as an heuristic to match a temporary doppler shift induced motion of 502 emitting 510. As the frequency of emission 510 from 502 is known, as well as the speed of light, and the expected maximum acceleration or speed, the set or range of all approximate possible phase shifts or frequency changes for a given interval (ex. 1 second) can be generated.

532 illustrates a digitized single cycle from 530, which is the normal expected frequency emitted by 502. 548 illustrates a doppler shifted or phase shifted single sample cycle which is digitized with the same number of points from 544 due to a phase shift pattern in the DDS used to generate the clock signal. The phase shift pattern may be derived from a pre-defined look up table generated from simulations of motion of the device whose emissions from 502 are being monitored.

548A represents 548 magnified, 542A represents 542 magnified, and 562 and 564 illustrates in more exaggerated detail the difference in time domain between 542 and 548 in both cycle duration and in ADC clock pulse acquisitions.

538 illustrates the clock signals used by the ADC for an unvaried normally received signal.

548 illustrates the clock signals used by the ADC for a doppler shifted or phase shifted cycle received signal wherein the shift occurs in the midst of the sample.

A whole acquisition period of ADC digitized data may be stored in memory and processed, or it may be continually processed by coherent integration. Different parts of the acquisition or different lengths of the acquisition may be separately processed. The best fit or highest amplitude result for the coherent integration is considered and chosen as representing the input signal buried in the noise. The phase shift pattern used to generate the best fit thus may be used to represent or determine the movement of 502.

The frequency change constraints limit the search space, thus saving time. Knowing the Allen deviation of a crystal used in an oscillator for example may be a constraint Multiple ADCs using, multiple DDS, MMCM or PLLs may be advantageously used to listen on multiple channels simultaneously.

A quadcopter may be better sensed, by predict its LO frequency range by temperature, extrapolation of frequency and phase over time, max acceleration, or other extrapolative or interpolative constraints.

Performing geolocation of devices or IEDs may also be enhanced in this manner, by enhancing their source signals.

Prefilters such as LC bandpass filters of bandwidth under 100 KHz, or crystal prefilters of bandwidth under 5 KHz may be used to eliminate strong interferers, potentially adversely saturating an ADC.

542B illustrates a unshifted clock signal for the ADC . . . .

It is contemplated that given the pattern or some elements of knowledge of constraints of the pattern of spread-spectrum clock generation (such as deviation limit in frequency), the invention can match it to extract the signal upon which it is based more clearly.

Another way to state the invention is it matches the clock characteristics (ex. frequency drift) of which the desired weak transmitter to be received is based to receive the signal with low SNR.

The invention can also be considered to be another way of filtering a signal to eliminate other unwanted signals and determine if a specific signal is present. This typically means the specified frequency and phase or phase drift limitation per unit of time.

The invention may be implemented in a satellite, wherein the doppler shift of a signal of interest on the ground or in space is compensated for by knowing or constraining the satellites' location, speed, path, or received signal approximate expected frequency.

It should be noted that given a broadband signal receive chain, the invention can also identify a non-sinusoidal repeating wave pattern which contains many frequencies from a noisy signal.

It is contemplated that one or more noise transmitter be made to add noise deliberately to the signal. It may be a separate noise transmitter and located at a separate location to hide the location source of the true intended information transmitter. It is contemplated this noise transmitter would also be received and receivable by the intended receiver. It is further contemplated that a deliberately constructed clock transmitter transmitting at one of more frequencies different from the information intended transmitter may be received by the intended transmitter and be used to transmit a signal which can be used as a basis for the phase coherent, phase correct information transmitter. The intended receiver or receivers also use the deliberately constructed clock transmitter to create their internal frequency and phase for extracting the intended signal from the noise.

The noise transmitter and clock transmitter may be located in the same device and transmit from the same location. A predetermined schedule method may be chosen to switch between multiple clock frequencies on a predetermined pattern basis to foil interlopers. Alternatively, a schedule may be transmitted to dynamically change choice of clock transmitters used.

Although specific advantages have been enumerated above, various embodiments may include some, none, or all of the enumerated advantages. Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

I claim:

1. An apparatus for enhancing communication Signal to Noise Ratio, the apparatus comprising,
a transmitter;
a clock source connected to said transmitter;
a timer connected to said clock source, wherein said timer is set by said clock source;
a processor connected to said transmitter, said processor receiving a clock signal from said clock source to set a transmission frequency, said transmitter transmitting a signal at said transmission frequency;
a receiver configured with another clock source, said receiver being substantially time-of-day synchronized with said transmitter;
said receiver uses said another clock source to substantially match a frequency of a transmitted signal;
wherein said receiver performs a time enhanced coherent integration on the signal transmitted by said transmitter to enhance signal to noise ratio in said transmitted signal and to extract a message contained within said signal.

2. The apparatus of claim 1 wherein the receiver also performs a non-coherent integration to extract a message contained within said transmitted signal.

3. The apparatus of claim 1 wherein said transmitter transmits pulsed signal having frequency slots.

4. The apparatus of claim 1 wherein said transmitter transmits pulsed signal having frequency slots, each frequency slot encodes a value and the receiver receives the each frequency slot to decode the value.

5. The apparatus of claim 1 wherein said transmitter transmits a value encoded in at least one or more of frequency slot, time slot, and phase shift.

6. The apparatus of claim 1 wherein said transmitter transmits in a time slot, said time slot is determined by power of the signal and a duration of a transmission and said receiver matches the duration of said transmission.

7. The apparatus of claim 1 wherein said transmitter transmits in a time slot, said time slot is determined by power of the signal and a duration of a transmission and said receiver matches the duration of said transmission, said transmission encoding a value and said receiver decoding said value.

8. The apparatus of claim 1 wherein said transmitter transmits encoded value(s) in at least one or more of frequency slot, time slot, phase shift, and said receiver using a heuristic to decode said encoded value(s).

9. The apparatus of claim 1 wherein said clock source is an AM broadcast station signal.

10. The apparatus of claim 1 wherein said signal is varied by phase to create interference and reinforcement in predetermined zones.

11. The apparatus of claim 1 wherein said signal is varied by phase to create interference and reinforcement in predetermined zones.

12. The apparatus of claim 1 wherein said signal is varied by phase to create moving zones of interference and reinforcement at predetermined locations and at predetermined speeds and directions.

13. The apparatus of claim 1 wherein matching of said transmitter and said receiver to clock sources is better than 1/(frequency*1.5).

14. A signal to noise ratio (SNR) enhancement apparatus, the apparatus comprising:
   a receiver coupled to an antenna, the receiver comprising:
      a clock source, wherein the receiver configured to substantially time synchronize with a transmitter, and wherein the receiver further configured to substantially match a frequency of a signal transmitted from the transmitter and received through the antenna, and
      a coherent integration unit configured to perform a time enhanced coherent integration on the signal to enhance SNR in the signal by integrating samples of a continuous waveform series of each bit within the signal and integrating samples and to extract a message contained within the signal.

15. The signal to noise ratio (SNR) enhancement apparatus of claim 14, wherein the receiver further comprises a non-coherent integration unit configured to perform a non-coherent integration to extract the message.

16. The signal to noise ratio (SNR) enhancement apparatus of claim 14, wherein the coherent integration unit is integrated into a field programmable gate array (FPGA).

17. The signal to noise ratio (SNR) enhancement apparatus of claim 14, wherein the receive further comprises the antenna.

* * * * *